(12) United States Patent
Dutta

(10) Patent No.: US 9,062,971 B2
(45) Date of Patent: Jun. 23, 2015

(54) E-COMPASS, TILT SENSOR, MEMORY AND PROCESSOR WITH COARSE DETILTING PROCEDURE

(75) Inventor: Goutam Dutta, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 868 days.

(21) Appl. No.: 12/398,696

(22) Filed: Mar. 5, 2009

(65) Prior Publication Data

US 2009/0254294 A1 Oct. 8, 2009

(30) Foreign Application Priority Data

Mar. 6, 2008 (IN) .............................. 565/CHE/2008
Mar. 6, 2008 (IN) .............................. 567/CHE/2008

(51) Int. Cl.
*G01C 17/00* (2006.01)
*G01C 17/28* (2006.01)

(52) U.S. Cl.
CPC ........... *G01C 17/28* (2013.01); *Y10T 29/49826* (2015.01)

(58) Field of Classification Search
CPC ........ G01C 17/30; G01C 17/38; G01C 21/28; G01C 25/005
USPC ................. 702/92; 33/326; 324/202
See application file for complete search history.

(56) References Cited

U.S. PATENT DOCUMENTS

| 5,287,295 | A  | * | 2/1994  | Ives et al. ...................... 702/92 |
| 5,828,984 | A  | * | 10/1998 | Cage et al. ..................... 702/92 |
| 6,543,146 | B2 |   | 4/2003  | Smith et al. |
| 6,823,279 | B1 |   | 11/2004 | Nadkarni et al. |
| 6,937,954 | B2 |   | 8/2005  | Jeong et al. |
| 7,251,567 | B2 | * | 7/2007  | Nickel et al. ...................... 702/9 |
| 7,340,362 | B2 |   | 3/2008  | Kitamura |
| 7,376,527 | B2 |   | 5/2008  | Hikida et al. |
| 7,379,814 | B2 |   | 5/2008  | Ockerse et al. |
| 2002/0188416 | A1 |   | 12/2002 | Zhou et al. |
| 2005/0234676 | A1 | * | 10/2005 | Shibayama ................... 702/141 |
| 2006/0190174 | A1 |   | 8/2006  | Li et al. |
| 2006/0241883 | A1 |   | 10/2006 | Kwon et al. |
| 2007/0084070 | A1 |   | 4/2007  | Honkura et al. |
| 2007/0156337 | A1 | * | 7/2007  | Yanni ............................. 701/213 |
| 2007/0288166 | A1 | * | 12/2007 | Ockerse et al. ............... 701/224 |

(Continued)

OTHER PUBLICATIONS

Global Positioning System (GPS). (2005). In The Crystal Reference Encyclopedia. Retrieved from http://www.credoreference.com/entry/cre/global_positioning_system_gps.*

(Continued)

*Primary Examiner* — Janet Suglo
*Assistant Examiner* — Michael Dalbo
(74) *Attorney, Agent, or Firm* — Lawrence J. Bassuk; Frank D. Cimino

(57) ABSTRACT

An electronic circuit includes an electronic compass having e-compass sensors mounted on different axes and operable to supply e-compass sensor data, memory circuitry, and an electronic processor coupled to said e-compass sensors and to said memory circuitry, said electronic processor operable to execute an electronic ellipse-fitting procedure responsive to the e-compass sensor data to generate at least one signal related to an ellipse tilt angle, and store the at least one signal in said memory circuitry as a tilt calibration parameter for the e-compass. Processes for calibrating an e-compass, as well as electronic circuits and processes for correcting measured heading, and processes of manufacture are also disclosed.

5 Claims, 10 Drawing Sheets

(56) References Cited

U.S. PATENT DOCUMENTS

2008/0071492 A1* 3/2008 Skvortsov et al. ............. 702/92
2008/0289203 A1 11/2008 Martikka et al.
2009/0054075 A1 2/2009 Boejer et al.
2009/0070057 A1 3/2009 Hirobe et al.

OTHER PUBLICATIONS

M.S. Grewal et al., "Global Positioning Systems, Inertial Navigation, and Integration," 2001, pp. 148, 154-156, 174-176, 199-200, 233, 235-236, 252-256, 318-326, 338-343, 361. FIGS. 6.8, 6.12, 6.13, 6.21, 7.5, 8.4, 8.5, C.7, C.9.

Kionix, AN006. "Handheld Electronic Compass Applications . . . " 13pp. FIGS. 3, 5, 10-12.

Kionix, AN020. "Orientations and Rotations" 6pp. No FIGS, Equations pp. 2-4.

"Application of Tilt, Slope, Rotation, and Offset in NISP_Win," http://www.paseeger.com/documents/TiltSlopeRotate_2005.PDF, 4pp. printed out Jan. 2, 2009, both FIGS.

" . . . ELLIPSEFIT . . . " Mathworks., date unk. 2pp. printed out Jan. 7, 2009. No FIGS.

* cited by examiner

E-COMPASS, TILT SENSOR, MEMORY AND PROCESSOR WITH COARSE DETILTING PROCEDURE

CROSS-REFERENCE TO RELATED APPLICATIONS

This application is related to India Patent Application Number 567/CHE/2008 filed Mar. 6, 2008, titled "Estimation Of Bias Error And Axes Gain For Mems Tri-Axes Accelerometers Implemented On Cell Phone Platform For Vehicle Navigation" and priority is claimed under the Paris Convention and 35 U.S.C. 119 and all other applicable law.

This application is related to India Patent Application Number 565/CHE/2008 filed Mar. 6, 2008, titled "Accurately Calibrating E-Compass For Tilt Error In A Suboptimal IMU System Comprising Of Accelerometer And E-Compass Mounted On Cell Phones" and priority is claimed under the Paris Convention and 35 U.S.C. 119 and all other applicable law.

This application is related to the U.S. patent application titled "Parameter Estimation for Accelerometers, Processes, Circuits, Devices and Systems" Ser. No. 12/398,775 (TI-65353) filed on even date herewith, and said U.S. patent application is incorporated herein by reference in its entirety.

This application is related to US patent application publication US 2009/0054075 dated Feb. 26, 2009, and U.S. patent application Ser. No. 11/844,006 (TI-38194) filed Aug. 23, 2007, titled "Satellite (GPS) Assisted Clock Apparatus, Circuits, Systems And Processes For Cellular Terminals On Asynchronous Networks" and said U.S. patent application documents are incorporated herein by reference.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

FIELD OF THE INVENTION

The field of the invention involves electronic compass (e-compass) processes and circuits, devices and systems including an e-compass. This invention is also in the fields of electronic computing hardware and software, navigation and communications, and processes of operating and making such circuits, devices and systems. Without limitation, the background is further described in connection with e-compass-based applications, circuits, devices and systems, such as for portable, including mobile, applications.

BACKGROUND

Magnetic compasses have been extremely useful for sensing directions and have been used for assistance in navigation over centuries. A pocket compass is a familiar personal item, with its suspended magnetized needle pointing to the magnetic North pole. Some cars are outfitted with a magnetic dial rotatably suspended in a transparent liquid-filled plastic enclosure mounted on the windshield or dashboard. In recent years with the advent of MEMS e-compass (micro-electro-mechanical system electronic compass) technology it is now possible to achieve convenient, low-cost electronic compassing in consumer and commercial portable applications. MEMS based accelerometers and e-compasses are low cost feasible options to provide navigation assistance to GPS for short durations.

Inertial navigation system (INS) technology has been based on gyroscope and accelerometers. For example, accelerometers can be assembled together with three perpendicular-mounted gyroscopes pivoted on gimbals and have provided in inertial platform that maintains pre-established directions of accelerometer sensor axes no matter how a vehicle moves, rotates, or generally changes direction of motion due to yaw, pitch and roll. E-compass has a miniature form factor and potentially low cost and can find its own space of application.

E-compass technology is becoming used in platforms such as low-cost navigation devices including position sensing devices and portable including mobile communication devices with position sensing using positioning technologies such as satellite positioning (e.g., global positioning system GPS) and/or positioning based on transmissions from one or more cell base stations. Accelerometer technology is also becoming used in such devices. In this way, when the positioning technology may have some variation and accuracy or service availability, such as due to variations in GPS visibility, the e-compass can complement the positioning technology and the accelerometer can also complement the positioning technology.

Direction signals from an e-compass can suffer from inaccuracy due to tilt errors and from magnetic disturbances called Hard Iron error and Soft Iron error. The Soft Iron error happens when the e-compass is subjected to time varying magnetic fields. The hard iron effect is a constant magnetic field that creates an additional disturbance to the e-compass heading measurement.

An accelerometer can be used to estimate tilt of the device or platform in a given resting position, but such tilt estimation is itself subject to enough error so that the direction signals from an e-compass can still suffer from inaccuracy due to tilt errors. Thus, even if tilt compensation of an e-compass is attempted based on accelerometer data, residual errors due to inadequate tilt compensation may exist due to non-idealities of the accelerometers.

Mobile telephony can communicate video and digital data, and voice over packet (VoP or VoIP), in addition to cellular voice. Streams of information such as video, voice, audio content, images of all kinds, and data should be flexibly handled by such portable including mobile devices or platforms. But power dissipation can limit time between battery recharges and limit the features and number of applications running. And system latency might cause various kinds of delays and lapses in desirable application operation.

Processors of various types, including DSP (digital signal processing) chips, RISC (reduced instruction set computing), information storage memories and/or other integrated circuit blocks and devices are important to these systems and applications. Containing or reducing energy dissipation, system latency and the cost of manufacture while providing a variety of circuit, device and system products with performance features for different market segments are important goals in integrated circuits generally and system-on-a-chip (SOC) design.

SUMMARY OF THE INVENTION

Generally and in one form of the invention, an electronic circuit includes an electronic compass (e-compass) having e-compass sensors mounted on different axes and operable to supply e-compass sensor data, memory circuitry, and an electronic processor coupled to the e-compass sensors and to the memory circuitry, the electronic processor operable to execute an electronic ellipse-fitting procedure responsive to the e-compass sensor data to generate at least one signal related to an ellipse tilt angle, and store the at least one signal in the memory circuitry as a tilt calibration parameter for the e-compass.

Generally, and in another form of the invention, an electronic circuit includes an e-compass oriented with a heading and having e-compass sensors mounted on different axes and operable to supply e-compass sensor data, memory circuitry holding a tilt angle e-compass calibration parameter, and an electronic processor coupled to the e-compass sensors and to the memory circuitry, the electronic processor responsive to the e-compass sensor data and the tilt angle e-compass calibration parameter to generate at least one signal representing a measured heading of the e-compass corrected using the tilt angle e-compass calibration parameter.

Generally, a process form of the invention involves a calibration process for an e-compass with sensors. The calibration process includes executing an electronic ellipse-fitting procedure responsive to data from the e-compass sensors to generate at least one signal related to an ellipse tilt angle for use as a tilt calibration parameter for the e-compass.

Generally, another process form of the invention involves a measuring process for measuring heading of an e-compass having sensors. The measuring process includes utilizing e-compass sensor data and a tilt angle e-compass calibration parameter to generate at least one signal representing a measured heading of the e-compass corrected using the tilt angle e-compass calibration parameter.

Generally, in an additional form of the invention, a portable electronic device is oriented with a heading to be measured. The device includes an e-compass having e-compass sensors mounted on different axes and operable to supply e-compass sensor data, and memory circuitry holding a tilt angle e-compass calibration parameter. An electronic processor is coupled to the e-compass sensors and to the memory circuitry, the electronic processor responsive to the e-compass sensor data and the tilt angle e-compass calibration parameter to generate at least one signal representing a measured heading of the e-compass corrected using the tilt angle e-compass calibration parameter, and a display is coupled to the electronic processor to display information based on the corrected measured heading of the e-compass.

Generally, a process of manufacture form of the invention includes attaching to a printed wiring board an electronic processor and an e-compass and a flash memory holding a tilt angle e-compass calibration parameter and instructions executable by the electronic processor to generate at least one signal representing a measured heading of the e-compass corrected using the tilt angle e-compass calibration parameter.

These and other forms of circuit, device, system, information storage medium, apparatus, process, and other forms of the invention are disclosed and claimed.

BRIEF DESCRIPTION OF THE DRAWINGS

Corresponding numerals in different Figures indicate corresponding parts except where the context indicates otherwise.

DETAILED DESCRIPTION OF EMBODIMENTS

Figure 1:
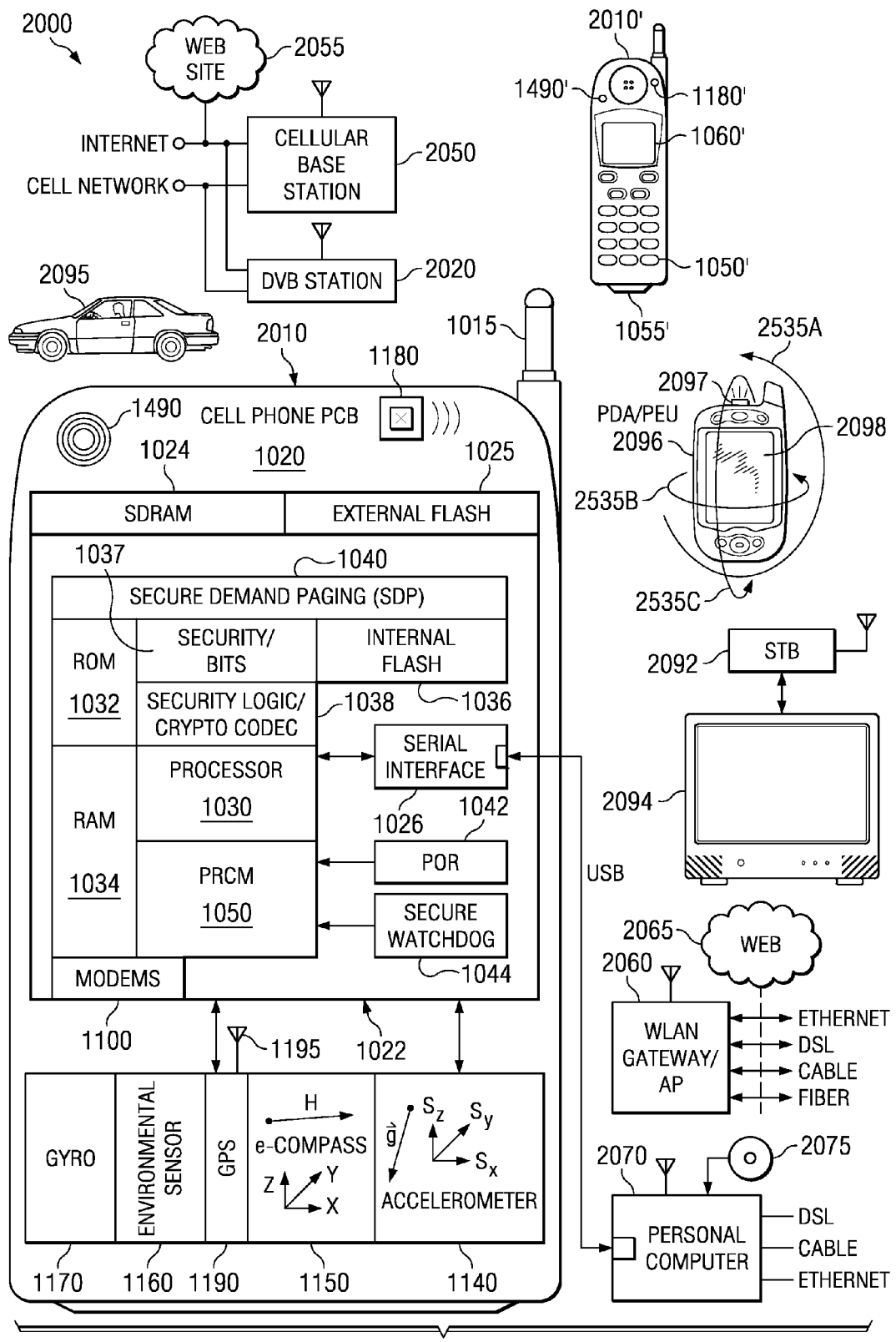
FIG. 1 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing inventively improved as in the other Figures.

In FIG. 1, an improved communications system 2000 has system blocks as described next and improved with any one, some or all of the circuits and subsystems and processes shown in various Figures of the drawing. Any or all of the system blocks, such as cellular mobile telephone and data handsets 2010 and 2010', a cellular (telephony and data) base station 2050, a WLAN AP (wireless local area network access point, IEEE 802.11 or otherwise) and/or a Voice over WLAN Gateway 2060 with user voice over packet telephone 2085 (not shown), and a voice enabled personal computer (PC) 2070 with another user voice over packet telephone (not shown), communicate with each other in communications system 2000. Worldwide web 2065 with website 2055 is readily accessible.

"Navigation" as used herein includes any one, some or all of position, direction, heading, tilt, altitude, azimuth, velocity and acceleration sensing and/or location-based applications, position-based applications, map-related applications, trajectory control, braking control, cruise control, steering control, engine control, course monitoring and completion, maneuvering, free fall detection, image acquisition control, image stabilization, and other applications combining or benefiting from any of the foregoing. "Portable device" as used herein includes any device, apparatus, or system, such as those stated herein as well as others, that is sufficiently movable in orientation to utilize and benefit from the embodiments and teachings herein.

In FIG. 1, personal and/or vehicular navigation is supported by an accelerometer 1140 and an electronic compass (e-compass) 1150. An environmental sensor 1160 is provided to check any one, some, or all of the temperature, humidity, pressure and/or other environmental physical variables. A miniature Gyro 1170 (gyroscopic inertial assembly) can be provided, with dimensions compatible with the form factor of the portable device. As part of a display screen or in addition, prompting transducers 1180 are provided for emitting flashing light signals, audible speech, and/or audible sounds such as calibration orientation prompts and distinct calibration confirmation prompts to the user. Processor integrated circuit 1022 is coupled to a satellite positioning integrated circuit 1190 for GPS or otherwise. GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous satellite-based electronic systems. The GPS circuit 1190 has an antenna 1195.

A camera 1490 provides video pickup for cell phone 2010 to send over the internet to cell phone 2010', personal digital assistant/personal entertainment unit PDA/PEU 2096, STB (set top box) 2092 and television TV 2094, automobile 2095 and to a monitor of PC 2070 via any one, some or all of cellular base station 2050, DVB (digital video broadcasting) station 2020, and WLAN AP/gateway 2060. Handsets 2010 and 2010' have a manual input 1050' such as a keyboard, a microphone 1055, a display 1060, and user prompt transducer(s) 1180 such as a flashing LED and/or audible transducer. Analogously, PDA/PEU 2096 has user prompt transducer(s) 2097, and a display 2098. Handsets 2010 and 2010' have a video storage and other information storage medium, such as hard drive, flash drive, high density memory, and/or compact disk (like CD 2075) in the handset or external thereto for installation of applications, etc. Digital video recording (DVR) is supported, such as for delayed reproduction, transcoding, and retransmission of video to other handsets and other destinations.

On a cell phone printed circuit board (PCB) 1020 in handset 2010, is provided a secure processor integrated circuit 1022, an external flash memory 1025 and SDRAM (synchronous dynamic random access memory) 1024, and a serial interface 1026. A Power, Resets, and Control Module PRCM 1050 (1770 of FIG. 2) is included to perform power and energy management and other support functions. Serial interface 1026 is suitably a wireline interface, such as a USB interface connected by a USB line to the personal computer 2070 and magnetic and optical media 2075.

Cell phone 2010 intercommunication also occurs via modems 1100, such as a cellular modem, WLAN, Bluetooth, and any other modem(s) and can access a website 2055 or 2065, television and physical layer (PHY) or other such circuitry 1100'. A WLAN and/or WiMax portion includes MAC (media access controller), PHY (physical layer) and AFE (analog front end). A MIMO UWB (ultra wideband) MAC/PHY supports OFDM in 3-10 GHz. UWB bands for communications in some embodiments. A digital video integrated circuit provides television antenna tuning, antenna selection, filtering, and RF input stage for recovering video/audio/controls from DVB station 2020.

Processor integrated circuit 1022 has MPU (or CPU) block 1030 coupled to an internal (on-chip read-only memory) ROM 1032, an internal random access memory RAM 1034, and flash memory 1036. A security logic circuit 1038 is coupled to secure-or-general-purpose-identification value (Security/GPI) bits 1037 of a non-volatile one-time alterable Production ID register or array of electronic fuses (E-Fuses), for enhancing secure e-commerce and system security generally. Depending on the Security/GPI bits, boot code residing in ROM 1032 responds differently to a Power-On Reset (POR) circuit 1042 and to a secure watchdog circuit 1044 coupled to processor 1030. Secure Demand Paging 1040 supports the system and increases the effective size of secure memory.

In this way, advanced networking capability for services, software, and content, such as cellular telephony and data, navigation applications, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), robotics, medical-related services, and other services accommodates and provides security for secure utilization and entertainment appropriate to the just-listed and other particular applications.

The embodiments, applications and system blocks disclosed herein are suitably implemented in fixed and portable devices such as for mobile, automotive 2095, seaborne, and airborne, communications, control, set top box 2092, television 2094 (receiver or two-way TV), and other apparatus. DLP™ display technology from Texas Instruments Incorporated, or liquid crystal display LCD or other video display technology is coupled to any of the system blocks of FIGS. 1 and 2. A transparent organic semiconductor display is provided on one or more windows of the vehicle 2095 of FIG. 1 and wirelessly or wireline-coupled to the video feed from the system 1700 of FIG. 2. The personal computer (PC) 2070 is suitably implemented in any form factor such as desktop, docking station, laptop, palmtop, organizer, mobile phone handset, PDA personal digital assistant 2096, internet appliance, wearable computer, content player, TV/appliance handheld remote control device, wireless pointer for game displays and other computer displays, still camera and other camera stabilization and display image stabilization, wearable personal safety monitor, personal area network, or other type and usable with media 2075 such as optical disk, flash drive, and other media.

In combination with the GPS circuit 1190, and the video display, the RISC processor 1422 and/or IVA (imaging and video applications unit) DSP 1424 support location-based embodiments and services of various types. These services provide roadmaps and directions thereon to a destination, pictorials of nearby commercial establishments, offices, and residences of friends, various family supervision applications, position sending to friends or to emergency E911 service, and other location based services now known or yet to be devised. For such services, fast time of position fixing, low system power consumption, and reliability of accurate timekeeping to support position-based services even during power management operations and cellular network base station handover or handoff operations are all desirable for improved technology such as supported by various embodiments herein.

Figure 2:
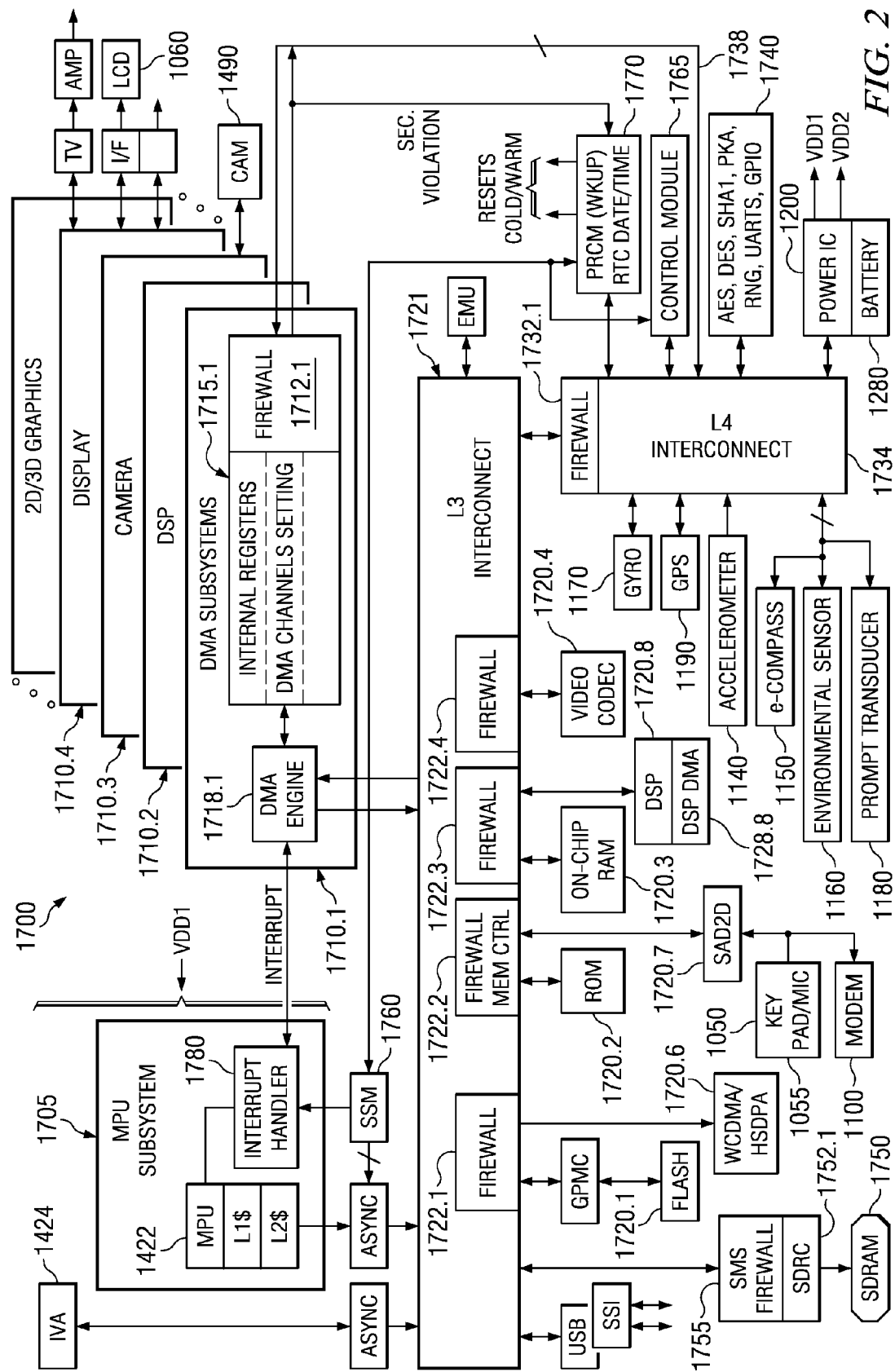
FIG. 2 is a block diagram of an electronic system such as for a system on a chip (SoC) inventively improved as shown in the other Figures.

It is contemplated that the skilled worker uses each of the integrated circuits shown in FIGS. 1 and 2, or such selection from the complement of blocks therein provided into appropriate other integrated circuit chips, or provided into one single integrated circuit chip, in a manner optimally combined or partitioned between the chips, to the extent needed by any of the applications supported by the cellular handsets 2010 and 2010', DVB station 2020, cellular telephone base station 2050, personal computer(s) 2070 equipped with WLAN, Voice WLAN access point/gateway 2060, as well as radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for personal, robotic and/or automotive use, combinations thereof, and other application products now known or hereafter devised for increased, partitioned or selectively determinable advantages.

In FIG. 2, a system 1700 for use in FIG. 1 has a MPU (microprocessor unit) subsystem 1705 with MPU core(s) 1422, an IVA subsystem 1424, and DMA (Direct Memory Access) subsystems 1710.*i*. Personal and/or vehicular navigation is supported by accelerometer 1140 and/or gyro 1170 and/or electronic compass (e-compass) 1150. The MPU subsystem 1705 suitably has one or more processor cores 1422 with RISC or CISC or other suitable central processing units CPUs such as with superscalar processor pipeline(s) with L1 and L2 caches. Either or both of the MPU subsystem 1705 and IVA subsystem 1424 has hardware for single cycle multiply-accumulates for matrix processing and fast loop execution, image processing, video processing, and audio processing. IVA 1424 provides one or more programmable digital signal processors (DSPs) for multi-standard (MPEG4, WMV9, RealVideo®, H.263, H.264) encode/decode at D1 (720×480 pixels), and 720p MPEG4 decode, for some examples. Also integrated are a 2D/3D graphics engine, a Mobile DDR Interface, and numerous integrated peripherals as selected for a particular system solution. The IVA subsystem 1424 has L1 and L2 caches, RAM and ROM, and hardware accelerators as desired such as for motion estimation, variable length codec, and other processing. DMA (direct memory access) subsystems 1710.*i* perform target accesses via target firewalls 1722.*i* and 1712.*i* of FIG. 1 connected on interconnects 1721, 1734. A target is a circuit block targeted or accessed by another circuit block operating as an Initiator. Some Initiators are MPU 1422, DMA subsystems 1710.*i*, Universal Serial Bus USB HS, and a secure debug access port to an emulation block EMU. In order to perform such accesses the DMA channels in DMA subsystems 1710.*i* are programmed. Each DMA channel specifies the source location of the Data to be transferred from an Initiator and the destination location of the Data for a target.

Data exchange between a peripheral subsystem and a memory subsystem and general system transactions from memory to memory are handled by the System SDMA 1710.1. The DMA channels support interconnect qualifiers collectively designated MreqInfo, such as MreqSecure, MreqPrivilege, MreqSystem in order to regulate access to different protected memory spaces. The system configures and generates these different access qualifiers in a security robust way and delivers them to hardware firewalls 1712.1, 1712.2, etc. via lines 1738 as well as to firewalls 1722.1, 1722.2, etc. associated with some or all of the targets. The hardware firewalls protect the targets according to different access rights of initiators. The DMA channels 1715.1, 2, etc. are configurable through the L4 Interconnect 1734 by the MPU subsystem 1705. Firewall configuration on a DMA interface 1715.*i* restricts different DMA channels according to the configuration previously written to configuration Internal Register fields. This Firewall configuration implements hardware security architecture rules in place to allow and restrict usage of the DMA channel qualifiers used in attempted accesses to various targets. When an attempt to configure access for DMA channels in a disallowed way is detected, in-band errors are sent back to the initiator that made the accesses and out-band errors are generated to a Control Module 1765 and converted into an MPU Interrupt for security attack detection and neutralization.

Data exchanges within a DSP subsystem 1710.2 are handled by the DSP DMA 1718.2. Data exchange to store camera 1490 image capture is handled using a Camera DMA 1718.3 in camera subsystem CAM 1710.3. The CAM subsystem 1710.3 suitably handles one or two camera 1490 inputs of either serial or parallel data transfer types, and provides image capture hardware image pipeline and preview. Data exchange to refresh a display 1060 is handled in a display subsystem 1710.4 using a DISP DMA 1718.4. This subsystem 1710.4, for instance, includes a dual output three layer display processor for 1× Graphics and 2× Video, temporal dithering (turning pixels on and off to produce grays or intermediate colors) and SDTV to QCIF video format and translation between other video format pairs. The Display block 1710.4 feeds a user-viewable display, such as a DLP™ display from Texas Instruments Incorporated or an LCD panel or other display, using either a serial or parallel interface. Also television output TV and Amp provide CVBS or S-Video output and other television output types for display.

In FIG. 2, a hardware security architecture including SSM 1760 propagates qualifiers such as an MreqSystem qualifier for virtual machines on the interconnect 1721 and 1734. The MPU 1422 issues bus transactions and sets some qualifiers on Interconnect 1721. SSM 1760 also provides one or more qualifiers. The bus transactions propagate through the L4 Interconnect 1734 and then reach a DMA Access Properties Firewall 1712.1. Transactions are coupled to a DMA engine 1718.*i* in each subsystem 1710.*i* which supplies a subsystem-specific interrupt to the Interrupt Handler 1780. Interrupt Handler 1780 is also fed one or more interrupts from Secure State Machine SSM 1760 that performs security protection functions. Interrupt Handler 1780 outputs interrupts for MPU 1422. In FIG. 2, firewall protection by firewalls 1722.*i* is provided for various system blocks 1720.*i*, such as GPMC (General Purpose Memory Controller) to Flash memory 1720.1, ROM 1720.2, on-chip RAM 1720.3, Video Codec 1720.4, WCDMA/HSDPA 1720.6, device-to-device SAD2D 1720.7 coupled to manual input 1050 such as keypad, Modem(s) 1100, and to a mixed signal (digital and analog) circuit coupled to microphone (MIC) 1055. DSP 1720.8 and DSP DMA 1728.8 also support the system via interconnect 1721. A System Memory Interface SMS with SMS Firewall 1755 is coupled to SDRC 1752.1 (External Memory Interface EMIF with SDRAM Refresh Controller) and to system SDRAM 1750 (1024).

In FIG. 2, interconnect 1734 is also coupled to Control Module 1765 and cryptographic accelerators block 1740 and a continually-powered Wakeup block WKUP 1770. Wakeup block 1770 has a Power, Reset and Clock Manager PCRM for power management and wakeup and a RTC (real time clock) for maintaining time and date. PRCM is coupled via L4 interconnect 1734 to Power IC circuitry in a power chip 1200 powered by a battery pack 1280. Chip 1200 supplies controllable supply voltages VDD1, VDD2, etc. for the rest of the system 1700. PRCM 1770 is coupled to L4 Interconnect 1734 and coupled to Control Module 1765. PRCM 1770 is coupled to a DMA Firewall 1712.i to receive a Security Violation signal, if a security violation occurs, and to respond with a Cold or Warm Reset output. Also PRCM 1770 is coupled to the SSM 1760.

In FIG. 2, some embodiments have symmetric multiprocessing (SMP) core(s) such as RISC processor cores in the MPU subsystem. A hardware (HW) supported secure hypervisor runs a SMP core. Linux SMP HLOS (high-level operating system) is symmetric across all cores and is chosen as the master HLOS in some embodiments.

In FIG. 2, digital circuitry in modem(s) 1100 supports and provides wireless interfaces for any one or more of GSM, GPRS, EDGE, UMTS, and OFDMA/MIMO embodiments. Digital circuitry provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1×EV-DV, 1×EV-DO or 3×EV-DV) data feature via an analog baseband core and RF GSM/CDMA core. An audio/voice block supports audio and speech/voice functions and interfacing. Speech/voice codec(s) and user voice-recognition/voice control are suitably provided in memory space in the audio/voice block for processing by processor(s) 1422, 1424. Modem(s) 1100 are coupled for use by personal and/or vehicular navigation applications to accelerometer 1140 and/or electronic compass (e-compass) 1150 and/or location-determining circuitry 1190 for GPS (Global Positioning System). Environmental sensor(s) 1160 are likewise coupled to the system. IC 1100 is also coupled to a USIM (UMTS Subscriber Identity Module).

In FIG. 2, an audio block has audio I/O (input/output) circuits to a speaker, a microphone, and headphones (not shown). The audio block is also coupled to an audible piezoelectric transducer in prompt calibration transducer 1180, which also has an LED (light emitting diode) that controllably emits flashing calibration initiation prompts and calibration confirmation prompts for accelerometer calibration.

Figure 3:
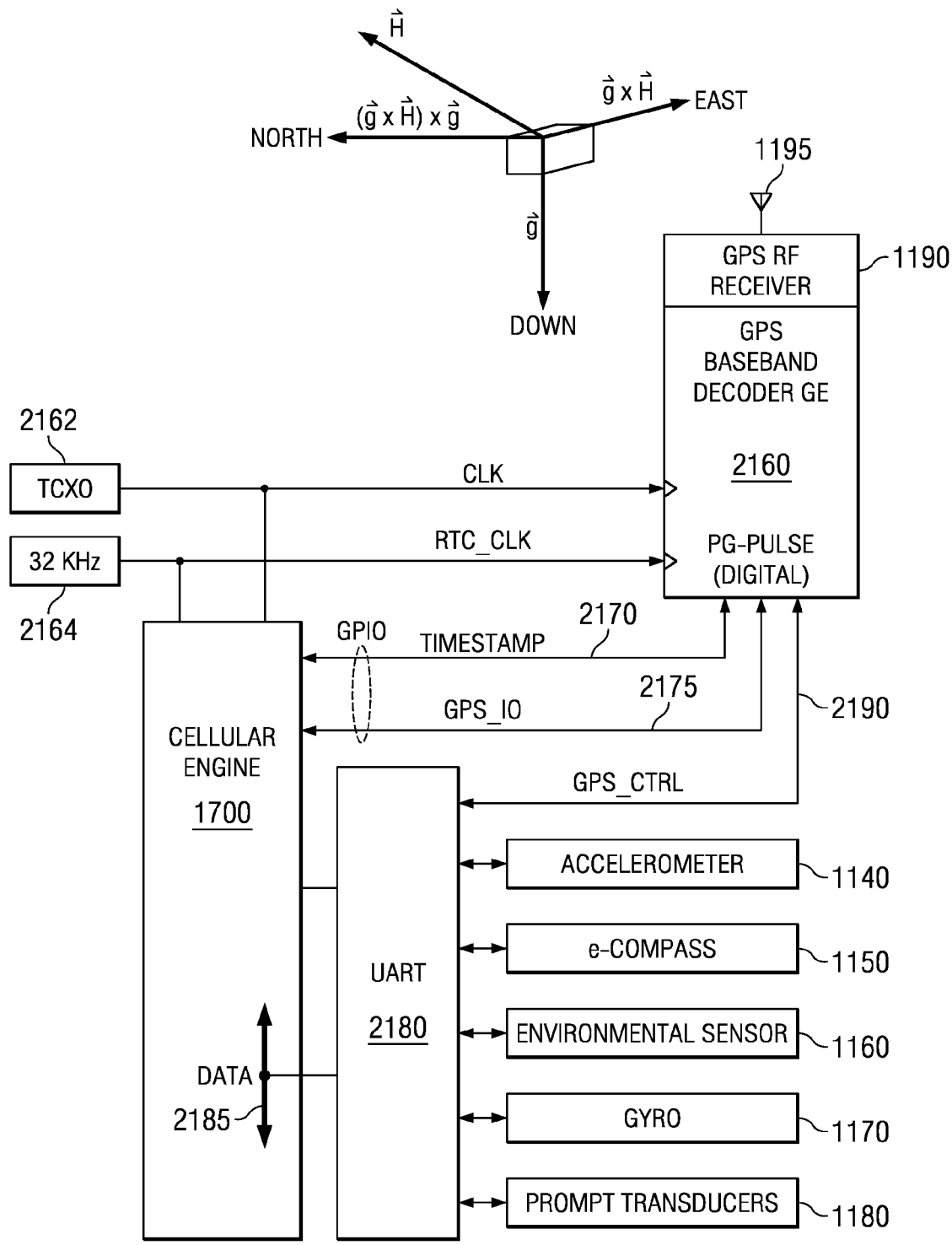
FIG. 3 is a block diagram of an inventive system including a satellite positioning engine or GPS engine GE inventively coupled with a processor integrated circuit in FIG. 2 operating as a cellular engine CE.

In FIG. 3, the improved system of FIG. 2 is further detailed. Personal and/or vehicular navigation is supported by accelerometer 1140 and/or electronic compass (e-compass) 1150, environmental sensor 1160, gyro 1170, prompt transducers 1180, and/or GPS unit 1190. GPS unit 1190 has an antenna 1195 for reception of satellite positioning signals and coupled to a GPS RF receiver provided as an analog or mixed-signal integrated circuit that in turn supplies signals to a digital GPS baseband decoder 2160 integrated circuit. GPS baseband decoder 2160 is called a satellite positioning engine or GPS engine GE 2160 herein. GPS (Global Positioning System) is a satellite positioning system for supplying satellite signals to GE 2160. The acronym GE herein is used to designate a baseband decoder circuit such as a satellite positioning computing engine herein whether of GPS type or any other satellite positioning scheme.

GE 2160 is coupled to the rest of system 1700 of FIGS. 2 and 3 by lines TIMESTAMP 2170 for timekeeping signals, GPS_IO 2175 for position data, and GPS_CTRL 2190 for controls. The rest of system 1700 is called a Communication Engine or Cellular Engine CE for this purpose and has a processor in hardware, or in hardware combined with software/firmware. In FIG. 3, Cellular Engine CE acts as a processing engine for time information derived from the cellular communications network. CE also processes some information from GE 2160, or not, depending on embodiment. CE need not be limited to cellular or wireless communication networks.

In FIG. 3, a printed wiring board has signal connection line TIMESTAMP 2170 and GSP_IO 2175 that couple strobe pulses and time-related information between the GE and CE. GE is coupled as a peripheral by a UART 2180 (universal asynchronous receiver/transmitter, i.e., a parallel/serial interface such as I2C, XPA, etc.) to interconnect 1734 of FIG. 2. Accordingly, a data bus 2185 in interconnect 1734 provides controls and data as parallel bits to the UART 2180 and these bits are supplied on particular lines in a set of lines 2190 to control the GE. For example, these lines convey control inputs to GE 2160 including a GSP_SLEEP input, a soft enable/reset GPS_EN_RESET, and a power up enable GPS_PWR_EN. Further lines to GE 2160 include interface lines for bi-directional serial communication.

In FIG. 3, a first clock 2162, such as a temperature compensated controlled crystal oscillator TCXO, has a frequency illustratively between 10 and 100 MHz or higher, that during reception is continually (or selectively) locked to or synchronized with clocks present in base stations. Between receptions the first clock 2162 keeps time when GPS 1190 is asleep, and clock 2162 itself is switched off or is left to run depending on the operating mode. A second clock 2164 has a lower frequency, e.g., below 1 MHz. such as at 32 KHz. The second clock 2164 is on and operative between receptions when the first clock 2162 is turned off for power saving. Processing circuitry CE is connected to the modem(s) 1100 and to the first clock 2162 and second clock 2164 and to GE 2160.

More information about a satellite positioning arrangement related to FIG. 3 is in US patent application publication US 2009/0054075 dated Feb. 26, 2009, and U.S. patent application Ser. No. 11/844,006 (TI-38194) filed Aug. 23, 2007, titled "Satellite (GPS) Assisted Clock Apparatus, Circuits, Systems And Processes For Cellular Terminals On Asynchronous Networks" and said U.S. patent application documents are incorporated herein by reference.

As shown in FIG. 1, the e-compass 1150 sensors X, Y, Z are mounted substantially perpendicular to one another and thereby define their own substantially perpendicular axes that constitute an e-compass reference frame that is securely affixed to the portable device as a whole. The e-compass 1150 sensor outputs accordingly deliver measured magnetic vector $H^m$ components $H_X^m$, $H_Y^m$, $H_Z^m$ relative to the e-compass reference frame. Some embodiments are directed specifically to obtaining heading information e.g., angle $\psi$ relative to magnetic North. The heading $\psi$ measured by the e-compass 1150 can depend on a physical tilt angle relative to the vertical, and various structure and process embodiments herein correct for the tilt in an improved manner. Some of the embodiments use either or both of accelerometer 1140 and/or e-compass 1150. Some embodiments use a tilt sensor that involves a vertically suspended mass instead of an accelerometer, and the angle of the vertical direction indicated by the mass relative to the e-compass reference frame indicates the tilt.

Tilt errors in an IMU system having accelerometer 1140 and e-compass 1150 (and Gyro 1170 if included) cause error in heading determination. Accelerometer 1140 provides tilt information on the tilt of the device or platform 2010, 2096, etc. at a given resting position or orientation, and the tilt information can be compensated for. However, the non-idealities of accelerometer 1140 cause finite error in tilt estimation resulting in inaccuracies of heading information such as estimation of heading angle ψ from e-compass 1150. This heading inaccuracy problem is solved in some embodiments by introducing a correction factor to the tilt compensation process. With such an improved process the heading angle ψ is determinable much more accurately even given inaccuracies of tilt estimation.

One solution to the problem for horizontal IMUs deciphers the orientation or heading information from the magnetic sensor readings, first by rotating a perfectly horizontal (i.e. not-tilted) e-compass 1150 in circles on a precision rotatable platform and plotting the Y sensor readings $H_Y^m$ versus the corresponding X sensor readings $H_X^m$. The plot in FIG. 4 approximates an ellipse. Notice that the x-coordinate axis of the graph in FIG. 4 pertains to e-compass X sensor readings $H_X^m$ and the y-coordinate axis pertains to e-compass Y sensor readings $H_Y^m$. Using the plotted ellipse, the lengths $S_x$, $S_y$ of the ellipse major axis and of the ellipse minor axis are measured or computed and recorded, and so too are the coordinates (X0, Y0) of the center of the ellipse. These are parameters of the ellipse. All the points of ellipse are then shifted and scaled accordingly at calibration time to make the ellipse a unit circle with center at origin. Then at post-calibration run time, any other measurement is similarly first shifted and scaled and then the orientation is found according to its location on the unit circle.

Figure 6:
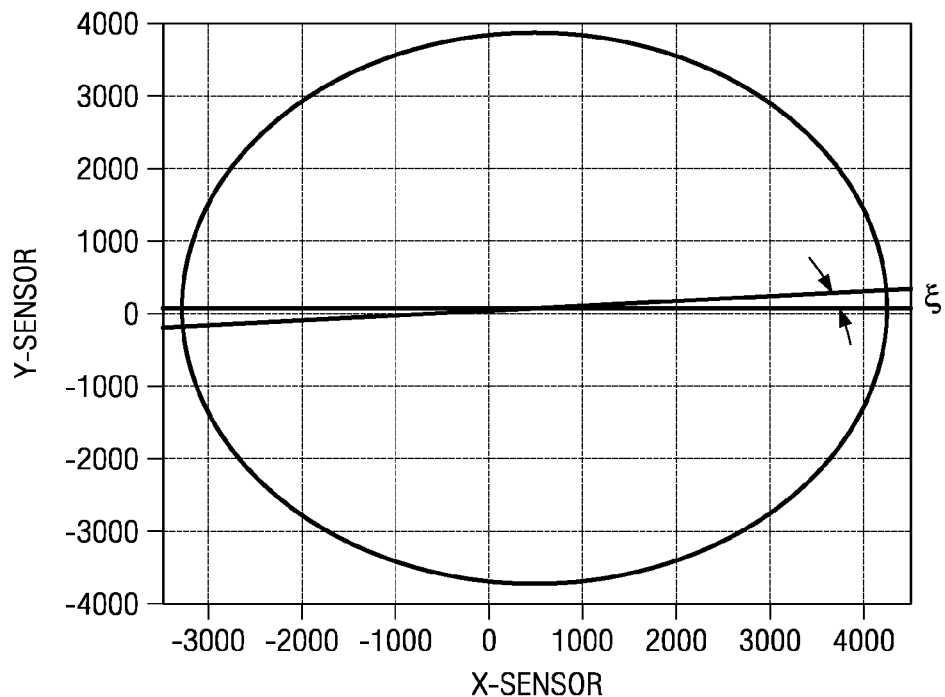
FIG. 6 is a two dimensional plot of an hypothetical ellipse fitted to de-tilted X and Y sensors data plotted on the x-axis and y-axis respectively and based on inaccurate tilt information from an accelerometer and showing a residual tilt $\xi$ (e.g., 3.35°).

For IMU mountings that are tilted, the accelerometer 1140 provides an initial tilt estimate that is used to de-tilt the e-compass 1150 tilt-affected measurements $H_X^m$, $H_Y^m$ which are ellipse-fitted. If the tilt estimation were perfectly accurate, detilting would lead to a similar ellipse to that of FIG. 4 when the X-Y e-compass sensor readings are plotted and detilted. However, with inaccuracies in tilt measurements by accelerometer 1140 or another type of tilt sensor, the ellipse is likely to be only coarsely detilted and the ellipse major and minor axes are likely to have some residual tilt angle xi (ξ) as in FIG. 6 with respect to the co-ordinate axes of the graph. This means that when the parameters of the ellipse in FIG. 6 are used to compute the heading angle ψ, that computation is degraded in accuracy.

Figure 7:
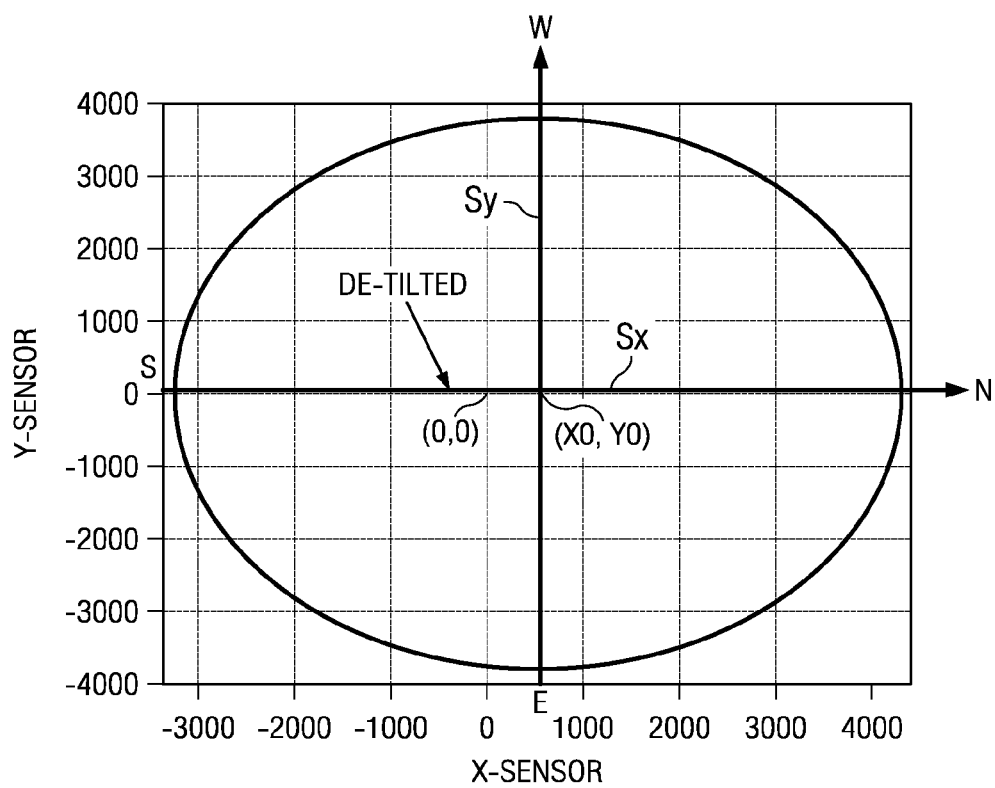
FIG. 7 is a two dimensional plot of an hypothetical ellipse fitted to de-tilted X and Y sensors data plotted on the x-axis and y-axis respectively and with additional tilt correction to substantially eliminate the residual tilt $\xi$ of the ellipse of FIG. 6 according to an embodiment herein.

In one kind of embodiment herein, accurate calibration is provided for an e-compass 1150 to compensate for tilt error in a suboptimal IMU system having an accelerometer 1140 and the e-compass 1150 mounted on a portable device such as a cell phone 2010. The residual tilt ξ at calibration time is determined by first using a generalized 2D (two-dimensional) best ellipse fit method to obtain the ellipse of FIG. 5 and that ellipse is then detilted coarsely or inaccurately to obtain the ellipse of FIG. 6. At this point the residual tilt ξ remains. Then in a further step that residual tilt ξ is removed in 2D by rotating the coarsely de-tilted measurements further by de-rotating by angle ξ in 2D. This leads to a zero-tilt ellipse of FIG. 7. The ellipse of FIG. 7 is then more accurately transformed to a unit circle with centre at origin. At post-calibration run-time, each heading measurement is made by similarly first detilting a run-time e-compass tilt-affected measurement point $H_X^{m'}$, $H_Y^{m'}$, $H_Z^{m'}$ with the accelerometer's tilt information, and then further rotating the X-Y points in 2D to correct for residual tilt ξ and then shifting and scaling with the resultant ellipse parameters. Finally, the heading angle ψ is read out from its more accurately determined position on the unit circle.

Introducing the final correction factor in 2D (estimating the residual tilt ξ and correcting it) dramatically reduces tilt related errors of e-compass technology as discussed later hereinbelow in connection with FIG. 8.

Providing an e-compass calibration correction to tilt inaccuracies of accelerometer 1140 reduces and mitigates heading inaccuracies of e-compass 1150 in combinations of accelerometer plus e-compass based DR (dead reckoning) solutions. Merely estimating tilt and performing heading ψ determination after coarse detilting of the measurements is problematic because to the extent tilt estimation is inaccurate, the e-compass 1150 is likely to show inaccuracies of heading ψ. Inaccuracy in tilt estimation by the accelerometer 1140 is beneficially taken care of by the e-compass calibration process. This leads to a nearly-perfectly tilt compensated mechanism for the e-compass 1150 even when the tilt estimation from the accelerometer 1140 may not be too accurate.

E-compass 1150 measurements $H_X^m$, $H_Y^m$, $H_Z^m$ are subject to inaccuracies or distortions in heading measurement caused by hard iron and soft iron effects and heading errors caused due to tilt. The soft iron effects happen when the e-compass 1150 is subjected to time-varying magnetic fields which are not pre-calibrated. The hard iron effect is a constant magnetic field that creates an additional disturbance to the e-compass heading measurement unless compensated.

Since the hard iron component M in the magnetic field remains constant and independent of compass heading ψ, the hard iron component M can be calibrated out using a calibration process embodiment described herein after some preliminary definition and mathematical analysis next. Processing time and power are conserved because only some of the steps in the mathematical analysis are programmed and executed on an electronic processor to achieve the calibration and post-calibration results that the analysis substantiates. For analysis purposes, suppose the e-compass 1150 is placed on a perfect horizontal platform. An example of an e-compass 1150 has three magnetic sensors positioned orthogonally (perpendicular to each other) along three axes of a 3D (three dimensional) Cartesian coordinate frame. Each magnetic sensor X, Y, Z is exposed to the true magnetic field vector H along its respective X, Y, Z sensor axis. The e-compass 1150 senses the horizontal magnetic field $H_h$ that is directed towards magnetic North on its horizontal sensors (e.g. X, Y sensors) and a vertical magnetic field component $H_v$ on its vertical sensor (e.g. Z-sensor). Define the true heading angle ψ relative to magnetic North as the angle at which the X-sensor is oriented relative to North, with East being angle ψ at 90 degrees, etc. The three components of a measured magnetic vector $H^m = [H_X^m, H_Y^m, H_Z^m]^T$ with e-compass 1150 at horizontal level are given by:

$$H_X^m = S_x H_h \cos(\psi) + X0 \quad (1A)$$

$$H_X^m = S_y H_h \sin(\psi) + Y0 \quad (1B)$$

$$H_X^m = S_z H_v + Z0 \quad (1C)$$

In equations (1A), (1B), (1C), the quantities $S_x$, $S_y$, and $S_z$ are the sensitivities of the three magnetic sensors on the three axes. Offset terms X0, Y0 and Z0 represent the vector components of a fixed magnetism vector M of a fixed magnetic disturber in the direction of each of the three axes due to hard iron effects. Superscript-T represents row-column transposition, e.g., of a row vector to a column vector, and asterisk "*" represents matrix multiplication. In the presence of the fixed magnetic disturber, the raw measurement output $H^m$ of the e-compass 1150 at horizontal level is a vector sum of the fixed magnetic disturber vector $M=[X0, Y0, Z0]^T$ and a product of the actual earth's magnetic field vector $H=[H_h, H_v]^T$ used to find magnetic North, times a direction matrix D representing the orientation of the horizontal e-compass at heading angle $\psi$, times an e-compass sensitivity matrix $S_C$ representing the relative sensitivities of the e-compass sensors when the e-compass is level-horizontal:

$$H^m = S_C * D * H + M. \quad (2)$$

Dimensionally, equation (2) is $(3\times1)=(3\times3)(3\times2)(2\times1)+(3\times1)$. Sensitivity matrix $S_C$ for e-compass 1150 is expressed by a preliminarily-assumed diagonal matrix. Cross-axes sensitivities due to any small e-compass sensor physical misalignments can replace the off-axis zeros and applied in some other embodiments.

$$S_C = \begin{bmatrix} S_x & 0 & 0 \\ 0 & S_y & 0 \\ 0 & 0 & S_z \end{bmatrix}$$

Direction matrix D is given by:

$$D = \begin{bmatrix} \cos\psi & 0 \\ \sin\psi & 0 \\ 0 & 1 \end{bmatrix} \quad (3)$$

Suppose now for analysis that the e-compass were next initially rotated in random circles to get a full coverage of 360° in the horizontal plane. Plotting the $(H_X^m, H_Y^m)$ e-compass X-sensor and Y-sensor measurements of such a motion would result in a two dimensional fitted-ellipse of FIG. 4 centered around (X0,Y0) and with major and minor axes expressed by the ordered pair $(S_x, S_y)$. The ellipse major axis in the graph of FIG. 4 corresponds to a magnetic North-South axis if $S_x$ equals or exceeds $S_y$, and the ellipse minor axis corresponds to the North-South axis if $S_x$ is less than $S_y$ in FIG. 4. (The former condition $S_x >= S_y$ is assumed for illustration.) Note also that the major and minor axes $(S_x, S_y)$ should not be confused with the x-coordinate and y-coordinate axes of the graph.

The ellipse centre and major and minor axes are estimated from the data at calibration time. Thereafter, the e-compass 1150 orientation for any run-time post-calibration measurement in the same horizontal plane is obtained by expressing that heading angle $\psi$ in terms of the arctangent of a linear transformation of the data to a unit circle. Mathematically, heading angle $\psi$ is the result of solving Equations (1A) and (1B) for $\psi$ to yield Equation (4).

$$\psi = \arctan\left[((H_Y^m - Y0)/S_y)/((H_X^m - X0)/S_x)\right] \quad (4)$$

The heading measurement problem becomes more complicated when the e-compass 1150 is not maintained in a horizontal position. This problem is solved according to various embodiments as taught herein and with attendant benefits and convenience for the user and for the portable device. In the presence of an arbitrary tilt of the e-compass platform relative to the horizontal, the tilt-affected output $H^{m'}$ of the e-compass 1150 is altered relative to the output $H^m$ that the e-compass 1150 would deliver when the platform is perfectly level-horizontal. Put another way, an actual tilt in e-compass position results in linearly transformed outputs $H^{m'}$ from the sensors themselves as expressed by equation (5):

$$H^{m'} = [H_X^{m'}, H_Y^{m'}, H_Z^{m'}]^T = \Omega * H^m = \Omega * [H_X^m, H_Y^m, H_Z^m]^T \quad (5)$$

Matrix $\Omega$ is the unknown co-ordinate transformation matrix representing or caused by actual physical tilt (due to unknown actual angles of Pitch $\phi$ and Roll $\theta$). The X-Y plot of a 2D rotation of e-compass 1150 results in a tilted ellipse of FIG. 5 geometrically tilted with respect to the x, y-coordinate axes of that graph. Because matrix multiplication mathematically expresses physical angular rotation or physical tilt, the graphical ellipse tilting occurs as a consequence on the graph. The tilting is inconsistent with equation (4), so heading error would be introduced by using equation (4) without first detilting the ellipse.

Figure 4:
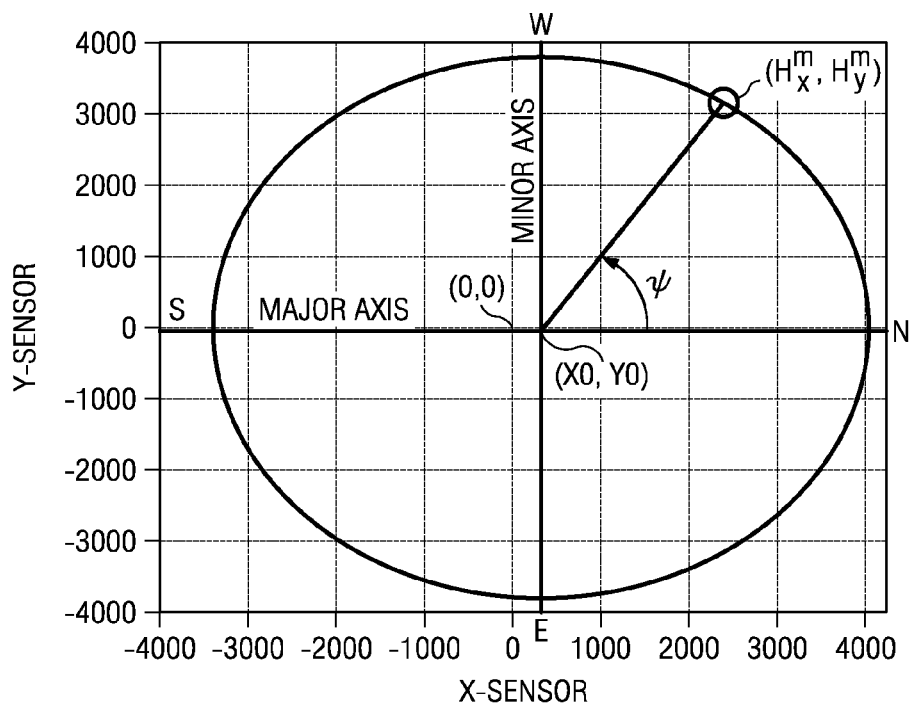
FIG. 4 is a two-dimensional graph of an hypothetical ellipse fitted to e-compass data plotted on the x-axis and y-axis respectively from sensors X and Y of the e-compass mounted for sensing a magnetic field in a horizontal plane and when the e-compass is rotated with a circular motion in a horizontal plane.
Figure 5:
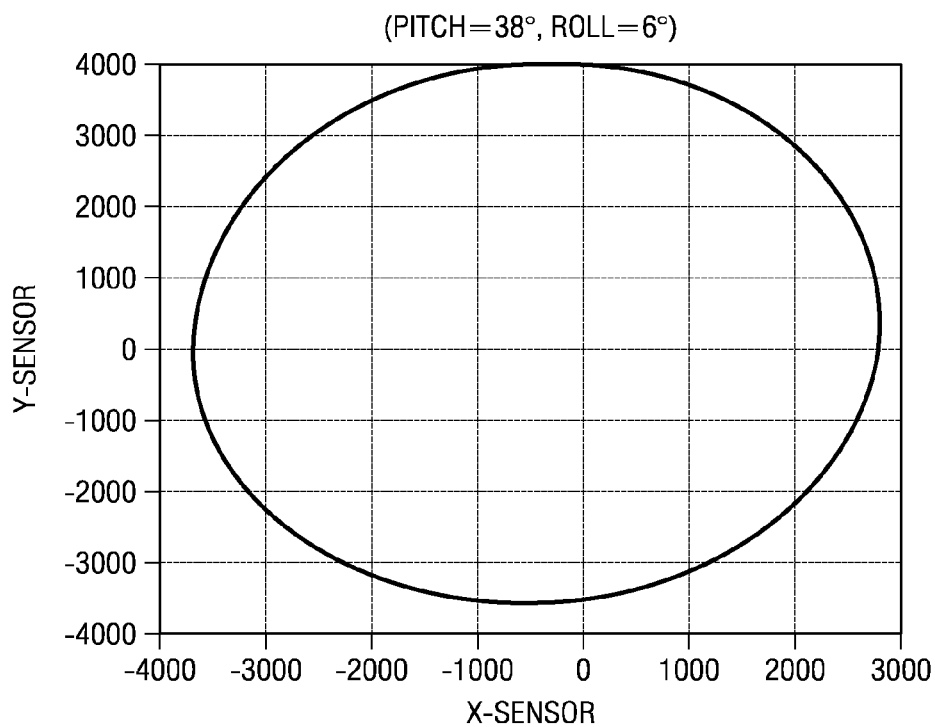
FIG. 5 is a two dimensional plot of an hypothetical ellipse fitted to the e-compass X and Y sensors data plotted on the x-axis and y-axis respectively when the e-compass is mounted to execute circular motion in a tilted frame (e.g., Pitch=38°, Roll=6°).

Direct estimation of heading orientation angle $\psi$ from the ellipse of FIG. 5 would result in undesirable inaccuracy of measurement result. However, the tilt of the IMU system is coarsely estimated using the accelerometer 1140 at the state of rest. Using the estimate of tilt, the e-compass sensor outputs for a circular motion around the physically tilted axis of rotation (see, e.g., FIG. 10) are coarsely de-tilted by processor operations representing a graphical detilting process to obtain the coarsely detilted ellipse of FIG. 6. As shown in FIG. 6, a tilt angle $\xi$ remains. Then a process taught herein makes an accurate tilt estimate of that remaining tilt angle $\xi$ and stores the numerical value representing angle $\xi$ thus obtained as part of the calibration output. The ellipse of FIG. 6 is brought back to a non-tilted version by de-rotation through angle $\xi$, see FIG. 7 and compare it with FIG. 4. Further calibration output is obtained by using the fully-corrected ellipse of FIG. 7. As represented by FIG. 7, the lengths of the major and minor axes and the coordinates of the ellipse center are evaluated to yield accurate, refined values respectively for the sensitivities $S_x$ and $S_y$ and the offset terms X0 and Y0 in Equations (1A) and (1B) and these are stored as well.

Figure 11:
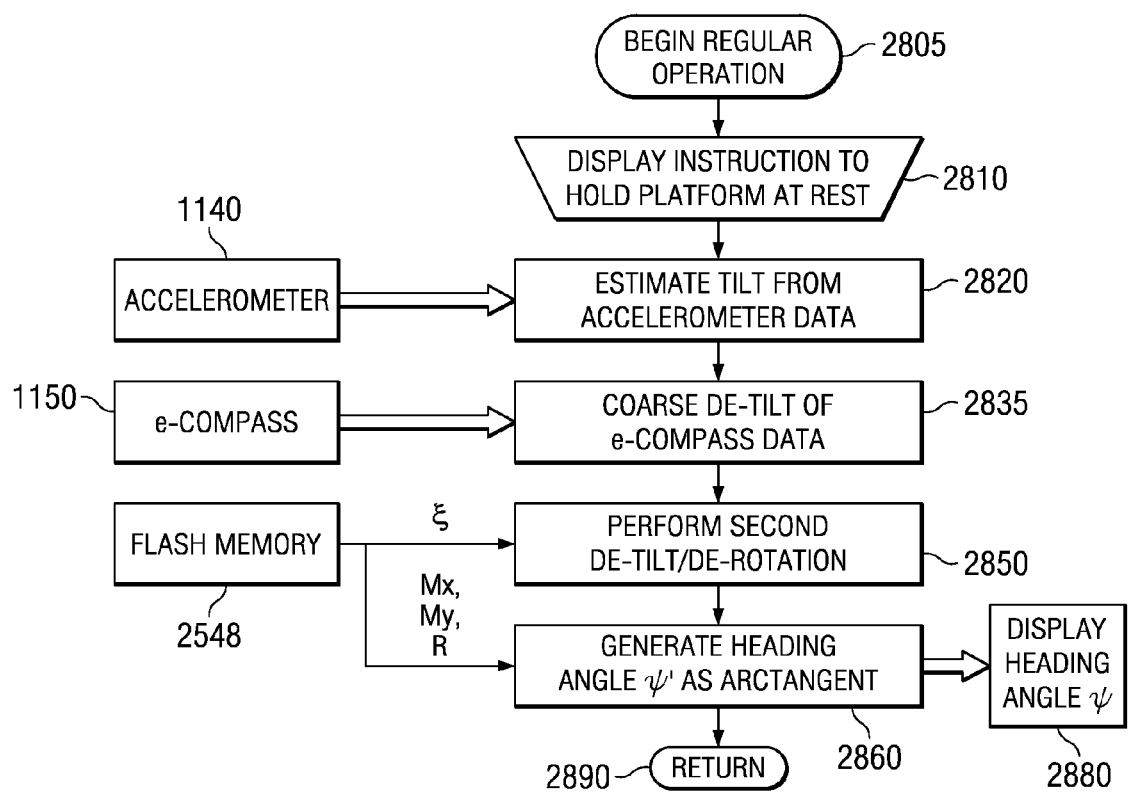
FIG. 11 is a flow diagram of an improved post-calibration process for finding measured headings using an e-compass in regular operation measuring a particular heading with or without an accelerometer.

Subsequent post-calibration measurement of heading angle $\psi$ in the same attitude of the platform then is measured by applying the de-rotation using the value of angle $\xi$ that was determined earlier at calibration time. Post-calibration measurement of heading angle $\psi$ by an electronic processor first coarsely de-tilts the tilt-affected e-compass 1150 data representing sensed vector $H_M'$ using a tilt estimate based on the information from accelerometer 1140 or from another type of tilt sensor. Then the processor further applies de-rotation using the value of angle $\xi$ that was determined earlier at calibration time. Finally, the processor executes instructions that use Equation (4) on the now-accurately de-tilted run-time measurement vector to obtain heading angle $\psi$. Notice that the calibration parameters resulted from ellipse-fitting to the raw data from many headings as discussed in the calibration paragraph hereinabove and also depicted in FIG. 9. By contrast, the run-time heading angle $\psi$ results from analysis of measured vector data from a single heading that is accurately and fully detilted as discussed in this post-calibration paragraph and as depicted in FIG. 11 using those calibration parameters.

As discussed herein, the accuracy of orientation or heading measured for a tilted IMU depends on the accuracy of tilt estimate from the accelerometer 1140. Given that the accelerometer sensors may have their own non-idealities (e.g., due to bias error vector $\mu$ and gain error matrix S), the tilt estimates are not likely to be very accurate, and indeed need not be very accurate for obtaining more accurate measurements according to processes and structures herein. However, coarse de-tilting using inaccurate accelerometer 1140 information without more correction is likely to compromise the orientation accuracy of measuring heading angle $\psi$.

The effect of a wrong tilt estimate using accelerometer 1140 and how to compensate for it are described next in greater detail. The sensor readings with e-compass 1150 at a horizontal-level position are given by Equations (1A), (1B), and (1C). For an actual tilt Ω involving Pitch phi φ and Roll theta θ, the actual e-compass sensor measurements $H^{m'}$ are given by Equation (5). Let the accelerometer-based estimate of a tilt transformation matrix be designated zeta ζ. (See Appendix 1 for a process by which accelerometer 1140 can output the matrix ζ.) The electronic processor pre-multiplies matrix ζ times the actual tilt-affected e-compass sensor outputs $H^{m'}$. Accordingly, a coarsely de-tilted version of the e-compass 1150 sensor reading is given by:

$$H^{m''} = [H_X^{m''}, H_Y^{m''}, H_Z^{m''}]^T \quad (6)$$
$$= \zeta^{-1} * [H_X^{m'}, H_Y^{m'}, H_Z^{m'}]^T$$
$$= \zeta^{-1} * H^{m'}$$
$$= \zeta^{-1} * \Omega * H^m$$
$$= \zeta^{-1} * \Omega * [H_X^m, H_Y^m, H_Z^m]^T$$

Note that the accelerometer-based estimated tilt transformation matrix ζ is an estimate of the matrix Ω representing actual tilt. Ideally the matrix product ($\zeta^{-1}*\Omega$) would be an identity matrix. For small estimation errors in Pitch φ and Roll θ angles, the matrix product $\zeta^{-1}*\Omega$ is given by a 3×3 matrix of Equation (7). Note that at this point the form of $\zeta^{-1}*\Omega$ is known, but its actual numerical matrix entry values are unknown. Fortunately, the calibration procedure can determine an ellipse tilt angle ξ that supplies at least one of the unknown values (namely, a).

$$\zeta^{-1} * \Omega = \begin{bmatrix} 1 & a & b \\ -a & 1 & -c \\ -b & c & 1 \end{bmatrix} \quad (7)$$

where $a=\delta\phi \sin(\theta):\delta\phi$ is the estimation error of Pitch angle φ; (7.1)

$b=\delta\phi \cos(\theta)$; and, (7.2)

$c=\delta\theta:\delta\theta$ is the estimation error of Roll angle θ. (7.3)

Equations (6) and (7) together represent the coarsely de-tilted e-compass sensor outputs of a tilted e-compass 1150. These equations assume the presence of small errors in tilt estimates from an accelerometer 1140 or other tilt sensor. The 2D X-Y vector of coarsely de-tilted output for some embodiments can use an acceptable approximation and is given by Equation (8):

$$[H_X^{m''}] = [1 a[H_X^m H_Y^{m''}] - a1]H_Y^m] \quad (8)$$

$H_X^m, H_Y^m$ signify the hypothetical un-tilted e-compass sensor outputs responsive to horizontal magnetic field components. $H_X^{m''}, H_Y^{m''}$ signify the coarsely de-tilted e-compass sensor outputs of a tilted IMU having accelerometer 1140 and e-compass 1150. In algebraic form, $H_X^{m''} \sim = H_X^m + aH_Y^m$, and $H_Y^{m''} \sim = -aH_X^m + H_Y^m$ (8A)

Figure 10:
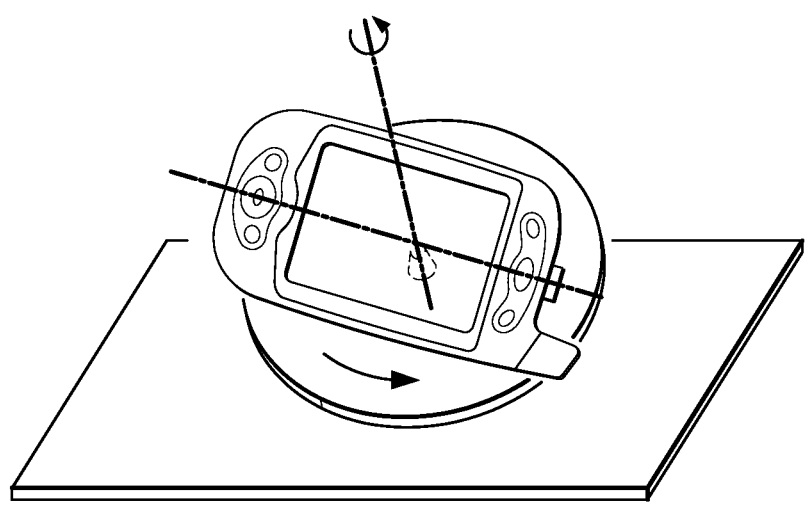
FIG. 10 is a pictorial diagram of a test table for the calibration process for use in manufacturing in mobile handset having an e-compass.

For finite estimation error of Roll and Pitch angles, the corresponding two dimensional plot of a circular motion of the e-compass platform as in FIG. 10 would result in a small but significant remaining tilt angle ξ in the 2D ellipse (FIG. 6) with respect to the x,y-coordinate axes notwithstanding the coarse detilting. Note that perfectly circular motion of the platform on a precision calibration mounting is not required, since various linear displacements of the e-compass 1150 up, down and sideways do not affect the e-compass ellipse. A cause of the ellipse tilt angle ξ is the presence of at least the term "a" in Equations (8) and (7). The calibration procedure not only measures ellipse tilt but also thereby determines the as-yet unknown value of matrix element "a" in the error matrix zeta-inverse-omega $\zeta^{-1}*\Omega$ of equation (7). Thus, the determination of tilt angle ξ at calibration time discovers information about the physical tilt so that it can be compensated for. The equivalent tilt ξ if left uncorrected would cause resultant errors in orientation, i.e., measured heading angle ψ.

In a calibration process embodiment herein, the data obtained from the coarsely de-tilted version (as obtained by the accelerometer 1140) of measurements from a circular motion of the e-compass 1150 is first fitted to a general second order equation representing a best-fitting ellipse. The ellipse fitting portion of the calibration procedure outputs the centre, minor and major axes and also the tilt angle (ξ) with respect to the axes. See Appendix III for an ellipse-fitting procedure example. For small estimation errors based on Equation (8), the tilt angle ξ is given by equation (9):

$\xi = \arctan(-a)$ or (9)

$-\xi = \arctan(a)$ or (9A)

$a = \tan(-\xi)$ (9B)

Tilt angle ξ in FIG. 6 is a graphical consequence of physical tilt Ω. More information about their relationship is provided later hereinbelow.

Once the resultant ellipse tilt (ξ) is estimated, the 2D ellipse is further corrected by de-rotating by angle (ξ), i.e., rotating by an angle (−ξ) as shown in Equation (10):

$$[H_X^{m'''}] = [\cos(-\xi) - \sin(-\xi)[H_X^{m''} H_Y^{m''}] \sin(-\xi)\cos(-\xi)]H_Y^{m''}] \quad (10)$$

Notice that before de-rotation, the major axis of the ellipse geometrically extends to a point on the x-coordinate axis that, in general, is different from the origin (0,0). Ellipse tilt (ξ) as discussed here represents the angle that the major axis makes relative to the x-coordinate axis, which is quantitatively the same angle that the major axis makes relative to a line parallel to the x-coordinate axis and passing through the ellipse center (X0, Y0). In general, ellipse tilt (ξ) is different from an angle χ=arctan(Y0/X0) that a line through the ellipse center from the origin makes with the x-coordinate axis.

Combining equations (9A), (8) and (10) yields Equation (11):

$$[H_X^{m'''}] = \sec(\xi) * [H_X^m H_Y^{m''}]H_Y^m] \quad (11)$$

For convenience to the reader, the intermediate step in reaching Equation (11) is given as Equation (11A) next. The matrix multiplication in Equation (11A) delivers sec(−ξ) times an identity matrix. The trigonometric identity employed is cos+sin tan=sec. The trigonometric secant (i.e., 1/cos) returns the same value regardless of the positive or negative sign of its argument. Thus the matrix multiplication of sec(−ξ) times an identity matrix is equivalent to simply multiplying by the scalar sec(ξ) as in Equation (11).

$$[H_X^{m'''} = [\cos(-\xi) - \qquad (11A)$$
$$\sin(-\xi)[1\tan(-\xi)[H_X^m H_Y^{m'''}]\sin(-\xi)\cos(-\xi)] - \tan(-\xi)1]H_Y^m]$$

Equation (11) shows that Equation (10) helps to transform $H_X^{m''}$, $H_Y^{m''}$ (the coarsely de-tilted values derived from coarsely detilting e-compass actual reading $H_X^{m'}$, $H_Y^{m'}$ of equation (5)) to the desired ideal horizontal reading $H_X^m$, $H_Y^m$ (with a scale factor sec($\xi$) being close to unity). Thus the added correction of Equation (10) is desirably performed by the electronic processor and helps when the tilt estimate $\zeta$ from the tilt sensor such as accelerometer 1140 is not accurate. The resultant 2D plot of $(H_X^{m'''}, H_X^{m'''})$ is a fully tilt-corrected ellipse depicted in FIG. 7 corresponding to the e-compass 1150 mounted in the horizontal position. The ellipse parameters are electronically computed and deliver sensitivities $S_x$ and $S_y$ and the offset terms X0 and Y0 as calibration outputs along with tilt angle $\xi$.

Notice that the major/minor ellipse axes of both FIG. 4 without e-compass tilt and FIG. 7 with e-compass tilt fully corrected are interpreted as magnetic North-related directions N, E, S, W. In other words, the fully detilted result in FIG. 7 is interpretable the same way regarding magnetic North-related directions N, E, S, W as FIG. 4. Since FIG. 4 assumes the user-inconvenient case of no tilt whenever, achieving the same result depicted in FIG. 7 by fully correcting for actual tilt confers a substantial benefit.

Subsequently, a run-time post-calibration process measures a current heading angle ψ with the e-compass 1150 in tilted position. The readings are transformed first to a 3D (three-dimensional) coarsely de-tilted position by electronically multiplying $\zeta^{-1}$ (Zeta-inverse) from accelerometer 1140 times e-compass sensor outputs $H^{m'}$ as in Equation (6). Then the electronic processing operations correct for coarse detilting estimation error $\zeta^{-1}*\Omega$, such as by applying Equation (10) to de-rotate by the tilt angle $\xi$ that was previously determined at calibration time. The detilted measurement $H_X^{m'''}$, $H_X^{m'''}$ is then used to obtain precise orientations, i.e., current measured heading angle ψ by the electronic processor executing Equation (4).

FIGS. 4, 5, 6, and 7 depict the ellipse fit of FIG. 4 of a circular motion for a perfectly horizontal e-compass mounting, the ellipse fit of FIG. 5 of a tilted mounting, the ellipse fit of FIG. 6 corresponding to coarse de-tilting and FIG. 7 showing the fully detilted result after the correction for tilt angle $\xi$ of FIG. 6. To illustrate advantageous operation, an experiment was carried out on a rotary table as in FIG. 10, giving it a controlled tilt. The tilt was estimated using an accelerometer 1140 output mounted on the same plane as the e-compass 1150. The table of FIG. 10 was first rotated continuously at 5 rpm, to get measured data to which an ellipse shape is fitted. Next, the table of FIG. 10 was rotated at intervals of 45° and readings were taken at state of rest. The orientation, i.e. heading angle ψ, was calculated by coarsely de-tilting the e-compass data using accelerometer 1140 tilt information. Next, the correction step in the embodiment to de-rotate tilt angle $\xi$ as taught herein was enabled and the heading angle ψ was again calculated.

Figure 8:
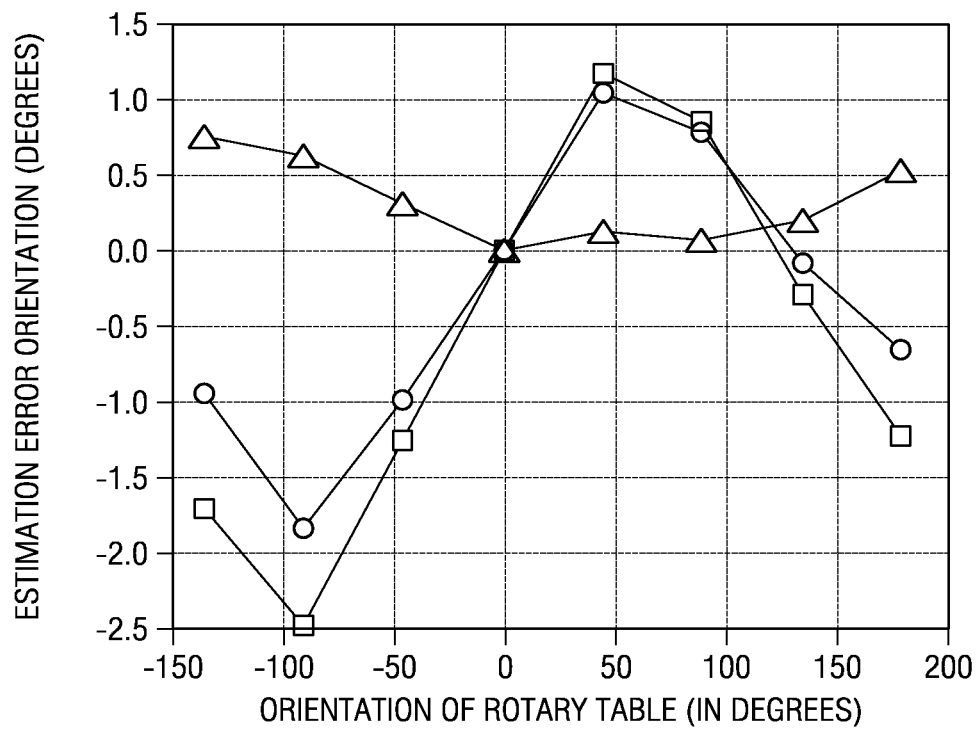
FIG. 8 is a graph having axes for estimation error in orientation (in degrees) versus actual orientation of a rotary test table (in degrees) of FIG. 10 for holding an e-compass, and having a first plot of orientation error obtained without correction for residual tilt $\xi$, a second plot of orientation error obtained with inventive correction for residual tilt $\xi$, and a third plot of estimation improvement (in degrees) representing the difference between the second plot and the first plot.

FIG. 8 shows and demonstrates advantageous operation of the embodiment over a method that uses accelerometer 1140 data for coarse detilting without the additional tilt correction for tilt angle $\xi$ of FIG. 6. The orientation error in estimation of heading angle ψ is less with the process embodiment that performed the additional tilt correction for tilt angle $\xi$ of FIG. 6. For some of the points the error reduction was as much as 0.6 degree, and the percentage error reduction was on the order of 25%, more or less. The process embodiment substantially reduces or substantially eliminates the orientation error due to tilt estimation inaccuracy of accelerometer 1140.

For manufacture and operation, the process embodiment described above is expected to be economical and readily detected and tested for a first kind of embodiment herein that includes an accelerometer-based de-tilting step. Accelerometer 1140 operation is verified by enabling and disabling the accelerometer 1140 so that the e-compass 1150 raw data reading is or is not detilted. For even small tilts, the orientation estimates from e-compass 1150 can be expected to depart from specified accuracy by an error proportional to the tilt angle for testing purposes if the accelerometer 1140 is disabled or decoupled from the improved IMU process. Measuring the direction accuracy of a marginally tilted e-compass 1150 in the absence of the accelerometer 1140 indicates whether the accelerometer is supporting the heading measurement process. Then the further tilt elimination step is activated or inactivated with the accelerometer 1140 active and accessible so that the test demonstrates presence or absence of augmented measured heading accuracy by the e-compass 1150 as in FIG. 8. When the further tilt elimination step is activated, with the accelerometer active and accessible, the overall process accurately corrects for tilt error and provides improved estimates for Hard Iron disturbers, as well as accurately compensating for tilt induced errors in e-compass 1150 even in the presence of small non-idealities of accelerometer 1140 sensors.

A second, alternative embodiment herein works well for a range of tilts (especially small tilts) even without accelerometer, by estimating the tilt angle of a best-fitting ellipse to data even without de-tilting using accelerometer data. That tilt angle of the best-fitting ellipse is directly subjected to correction and reduction to zero according to such process embodiment without using the accelerometer for de-tilting first. This embodiment of the process is tested with an accelerometer 1140 decoupled from the process by blocking accelerometer access or omitting the accelerometer itself from the structure with which the process is associated. Then the process is tested by rotating the e-compass 1150 to demonstrate that the estimates of orientation are accurate to a specified level of accuracy for the testing purposes for at least small tilts even in absence of the accelerometer.

Figure 9:
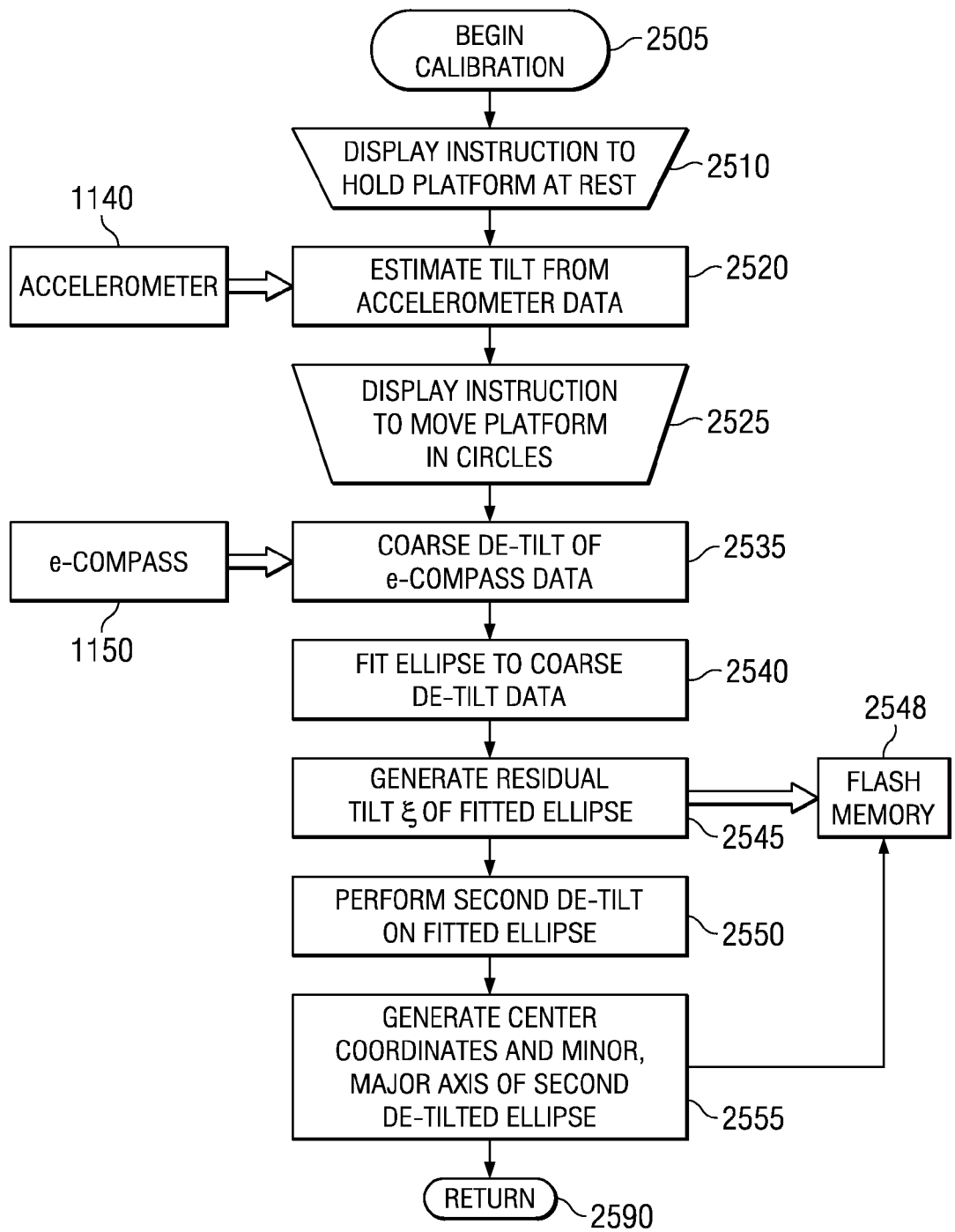
FIG. 9 is a flow diagram of an improved calibration process for reducing estimation error in e-compass measurements supported by an accelerometer for tilt measurement.

In FIG. 9, a calibration process embodiment commences with a BEGIN 2505 and proceeds to display an instruction to user in a step 2510 to hold the device or platform at rest docked on a test stand, vehicle, carrier, or charger, or docked on a belt clip of the user at some arbitrary tilt. The user or tester complies with instruction and holds the device or platform at rest. A process step 2520 first verifies that the accelerometer 1140 output $f^m(k)=[f_x^m(k) \ f_y^m(k) \ f_z^m(k)]^T$ has become stable, indicating that the device or platform is indeed at rest. An example of stability determination checks that plural samples of accelerometer data over at least a specified period of time (e.g., about a second or a few seconds) are all within a predetermined amount of variability indicated by a variability metric such as sum of squared differences of like data components from accelerometer, sum of absolute difference values thereof, etc. Process step 2520 then estimates the tilt, such as angles for Pitch φ and Roll θ as described in Appendix I. Tilt information such as an accelerometer estimate of tilt transformation matrix $\zeta$ or its inverse $\zeta^{-1}$ or some other accelerometer sensor information from which the tilt transformation matrix $\zeta$ or its inverse $\zeta^{-1}$ can be computed. See, e.g., Appendix II Equation (A2-3) combined with Appendix I Equation (A1-6).

A succeeding step 2525 displays an instruction to user to move the device or platform with an e-compass 1150 in circles. Such data approximates an ellipse. If this calibration process is performed in a manufacturing process for making a portable, including mobile, device as device or platform with the e-compass, the device or platform is mounted on a rotatable test stand as in FIG. 10 and rotated around the axis of tilt a few times to capture data from e-compass 1150. Or the e-compass 1150 can have a recess to journal rotatably on a fixed pivot stud of a fixed test stand or automotive mount. Then the mobile device is rotated on the pivot stud. There is no need to maintain a fixed center of rotation for the approximate circle or random circle or trajectory through which the user turns the device or platform. A vehicle having the e-compass can be driven in a circle or figure-8.

Preferably, at least one turn of the device or platform relative to the environment is thus performed. A step 2535 de-tilts the e-compass 1150 data $H_M'$ based on the accelerometer tilt data $\zeta$ from step 2520 inverted such as using Equation (6) $H_M'' = \zeta^{-1} * H_M'$. This de-tilt step 2535 amounts to a coarse de-tilt because the accelerometer based de-tilting is expected to be subject to enough error to introduce inaccuracy. In other words, in the event of inadequate tilt compensation, the ellipse of FIG. 6 that fits the data thus compensated can be expected to bear a residual tilt angle $\xi$ with respect to the 2D Cartesian coordinates relative to which the ellipse mathematically is situated.

In FIG. 9, a subsequent step 2540 fits an ellipse to the coarsely de-tilted data from coarse de-tilting 2535. The fitted ellipse as in FIG. 6 is tilted from its coordinate axes by the above-mentioned tilt error $\xi$. In the absence of hard iron M and soft iron magnetic disturbers and differences or variations (gain errors) in the sensitivity $S_C$ of the magnetic sensors relative to each other in the e-compass 1150, the fitted ellipse would be a circle with its center at the origin of coordinates. In actuality, when the X and Y magnetic sensors have gain errors, the data approximates an ellipse. When a fixed disturber is present, such as a hard iron magnetic disturber, the ellipse that fits the data has its center displaced from the origin to a point $(M_x, M_y)$. Also, tilting the e-compass 1150 from the horizontal, and then coarsely or inaccurately compensating for the tilt as just described, leaves a residual tilt error that shows up as a residual tilt angle $\xi$. Tilt angle $\xi$ is the tilt angle of the minor or major axis of that data-fitted ellipse relative to the angularly-nearest coordinate axis to which such minor or major axis would otherwise be parallel.

In the process embodiment of FIG. 9, a numerical value of residual tilt angle $\xi$ of the ellipse is estimated by a step 2545 using any available ellipse fitting process or algorithm and stored to Flash Memory 2548 for post-calibration use in FIG. 11. Even though the actual tilt matrix $\Omega$ of Equation (5) is unknown, and the accelerometer tilt data $\zeta$ from step 2520 is a less than fully accurate estimate of the actual tilt matrix $\Omega$, measured tilt error $\xi$ of the fitted ellipse beneficially provides information to quite substantially reduce the inaccuracy in the estimate of physical tilt represented by the accelerometer tilt data $\zeta$. Post-calibration use of measured tilt error $\xi$ stored in Flash Memory 2548 in FIG. 11 is uncomplicated and convenient.

Further in FIG. 9, the coarsely de-tilted magnetic values $H^{m'}$ are further de-rotated in a step 2550 by residual tilt angle $\xi$. Step 2550 performs this second de-tilting operation on the fitted ellipse by de-rotating the fitted ellipse back through the residual tilt angle $\xi$, see discussion of Equation (10) and Appendix II. After the de-rotation the minor or major axis of that data-fitted tilted ellipse of FIG. 6 becomes parallel to the nearest coordinate axis. Thus, a zero-tilt ellipse of FIG. 7 results from this second tilt compensation step 2550.

A further step 2555 generates the center coordinate values $(M_x, M_y)$ and the measured values for minor axis and major axis of the de-rotated fitted zero-tilt ellipse resulting from the second de-tilting step 2550. The thus-measured center coordinate values provide hard iron correction components $(M_x, M_y)$ for the fixed magnetic disturber, and the minor axis and major axis length values are proportional to the relative sensor sensitivity values $S_{Cx}$ and $S_{Cy}$ of the X and Y magnetic sensors. In step 2555, 2D (two-dimensional) fixed disturber values and a ratio of sensor sensitivities are estimated from the center coordinates of the fitted ellipse and a ratio R computed from the lengths of the major and minor axes. The ratio R of the ellipse axes is a measure of the ratio of sensitivities for the X, Y magnetic sensors assigned to those axes, and ratio R measures gain error when the ratio R departs from unity (1.00). After step 2555, a RETURN 2590 is reached.

In FIG. 11, a process embodiment provides post-calibration regular operation of the device or platform with the e-compass 1150. Accelerometer 1140, e-compass 1150, and Flash Memory 2548 have the same drawing numerals in FIG. 11 as in FIG. 9 because the process embodiments apply to the same device used in different ways. This post-calibration process embodiment commences with a BEGIN 2805 and proceeds to display an instruction to user in a step 2810 to find the heading $\psi$ by holding the device or platform still, to take a heading. Also, the device can be made stationary or at rest docked on a test stand, in a vehicle, carrier, or charger, or docked on a belt clip of the user at some arbitrary tilt when the user is standing still. Step 2810 can be omitted in devices that operate to continually determine the heading.

A process step 2820 first verifies that the accelerometer output has become stable at rest, such as by determining that plural samples of accelerometer data over at least a specified period of time are all within a predetermined amount of variability indicated by a variability metric. A sum of squared differences of like data components from accelerometer, or sum say of absolute difference values thereof, etc., can be used as a variability metric. Process step 2820 then estimates the tilt, such as angles for Pitch $\phi$ and Roll $\theta$. Based on accelerometer 1140 sensor data at rest, step 2820 generates tilt information such as tilt transformation matrix $\zeta$ or its inverse $\zeta^{-1}$ or some other accelerometer sensor-based information from which the tilt transformation matrix $\zeta$ or its inverse $\zeta^{-1}$ can be computed.

A step 2835 de-tilts the e-compass data $H_M'$ based on the accelerometer tilt matrix $\zeta$ from step 2820 inverted such as by the electronic processor programmed with and executing Equation (6) $H_M'' = \zeta^{-1} * H_M'$. This de-tilt step 2835 amounts to a coarse de-tilt because the accelerometer tilt data is expected to be subject to enough tilt error $\xi$ to introduce inaccuracy. In this way, the e-compass readings are captured and de-tilted coarsely using the tilt estimate from the accelerometer 1140.

In the process embodiment of FIG. 11, calibrated residual tilt angle earlier stored by FIG. 9 step 2545 is retrieved from Flash memory 2548 by a step 2850 of FIG. 11 in post-calibration operation for post-calibration heading measurement. Even though the actual tilt matrix $\Omega$ of Equation (5) is unknown precisely, the accelerometer tilt data $\zeta$ and/or angle estimates $\hat{\phi}$, $\hat{\theta}$ from step 2820 can be used to provide an approximate estimate of the actual tilt matrix $\Omega$. Then the calibrated residual tilt angle $\xi$ from FIG. 9 beneficially provides information to quite substantially reduce in step 2850 the inaccuracy in the estimate of tilt represented by the accelerometer tilt data $\zeta$. Step 2850 performs a second de-tilting operation on a data point $H^{m''}$ by de-rotating that data point using the calibrated residual tilt angle $\xi$, see discussion of Equation (10).

A further step 2860 retrieves the calibrated center coordinate values, i.e. hard iron offset values ($M_x, M_y$), and retrieves Ratio $R=S_y/S_x$ from flash memory 2548. These values ($M_x, M_y$) represent the Hard Iron effect and are independent of tilt and orientation toward magnetic North. The ratio R represents the ratio of sensitivities for the X, Y magnetic sensors assigned to those axes, and ratio R measures gain error when the ratio R departs from unity (1.00). These stored parameters are taken from the zero tilt ellipse after fine compensation in the calibration process of FIG. 9. Step 2860 generates and reads out the measured heading angle $\psi'$ (psi-prime) such as by using the arctangent Equation (12) with the calibration values retrieved from flash memory 2548:

$$\psi'=\arctan(((H_Y^{m'''}-M_y)/(H_X^{m'''}-M_x))/R) \qquad (12)$$

In FIG. 11, another process embodiment is capable of correcting for small physical tilts $\Omega$ even in the absence of an accelerometer or other tilt sensor. In that case, operations take an e-compass reading (data point $H^{m'}$) in step 2810 and then bypass steps 2820 and 2835 and go directly to step 2850. In a step 2850, operations obtain a value of tilt angle $\xi$ from Flash 2548 assuming, e.g., Pitch $\phi=0$ and Roll $\theta=0$. Then the data point $H^{m'}$ is de-rotated by angle $\xi$ directly. Steps 2860-2890 are as described above.

A 3D analysis of e-compass calibration including tilt correction is provided next. Additional process embodiments are described which also have calibration process embodiments parallel to FIG. 9 and post-calibration run time process embodiments parallel to FIG. 11. Let the e-compass 1150 sensor axes be physically parallel to the accelerometer 1140 sensor axes. If this is not the case, an additional tilt matrix $\Omega_3$ is provided.

With a tilt compensation error, the uncompensated 3D rotation matrix can be written as in Equation (7).

$$T_{uncompensated} = \begin{bmatrix} 1 & a & b \\ -a & 1 & -c \\ -b & c & 1 \end{bmatrix} \qquad (7)$$

In 2D a process embodiment uses the XY axes information, and extracts the 2D structure corresponding to XY axes:

$$\begin{bmatrix} 1 & a \\ -a & 1 \end{bmatrix}$$

The matrix element "a" is computed according to:

$$a=\tan(-\epsilon_{xy}), \qquad (7a)$$

where $\xi_{xy}$ is the angle made by the XY ellipse (Y value vs X value) major axes with X-axis.

In 3D, an augmented process embodiment similarly computes matrix element "b" according to:

$$b=\tan(-\xi_{xz}) \qquad (7b)$$

where $\xi_{xz}$ is the angle made by the XZ ellipse (Z value vs X value) major axes with X-axis.

And, a further 3D augmented process embodiment analogously computes matrix element "c" according to:

$$c=\tan(\xi_{yz}) \qquad (7c)$$

where $\xi_{yz}$ is the angle made by the YZ ellipse (Y value vs Z value) major axes with Y-axis.

The 3D vector after basic tilt compensation is further de-tilted by matrix $T_{uncompensated}$.

The 3D description turns to a further 3D matrix-based ellipsoidal analysis, with discussion of applicable centers of de-rotation. In the description herein above, Equation (2) involves a vector sum of fixed magnetic disturber vector $M=[X0, Y0, Z0]^T$ and a product of the actual earth's magnetic field vector $H=[H_h, H_v]^T$ used to find magnetic North, times a direction matrix D representing the orientation of the horizontal e-compass at heading angle $\psi$, times an e-compass sensitivity matrix $S_C$ representing the relative sensitivities of the e-compass sensors when the e-compass is level-horizontal:

$$H^m=S_C*D*H+M. \qquad (2)$$

The ellipse shape is deduced by manipulating equations (1A) and (1B), and then squaring and adding so that the analytic geometry equation for an ellipse, without tilt, is revealed:

$$[(H_X^m-X0)/S_x]^2+[(H_Y^m-Y0)/S_y]^2=H_h^2(\cos^2\psi+\sin^2\psi)=H_h^2 \qquad (15)$$

To deal with the more complex 3D case involving the relationship of physical tilt to graphical tilt, it is useful to first express the full matrix equation for a three-dimensional (3D) ellipsoid when the e-compass is level-horizontal, un-tilted:

$$(H^m-M)^{T}*S_C^{-1T}*S_C^{-1}*(H^m-M)=\|D*H\|^2 \qquad (16)$$

Equation (16) expresses the constancy of the magnitude $\|D*H\|$ of Earth's 3D magnetic field vector in the locality of the e-compass 1150 regardless of the e-compass heading-related 3D measurement sensor vector $H^m$ and disregarding the hard iron magnetic disturber M and disregarding any soft iron.

Designate the magnetic field of the actual hard iron magnetic disturber relative to the e-compass by a vector $M_0$. Then write Equation (2.1) for an e-compass at horizontal-level (no tilt). Comparing equations (2) and (2.1), $M=S_C*M_0$.

$$H^m=S_C*(D*H+M_0). \qquad (2.1)$$

Equation (5) earlier above is useful, for instance, when the e-compass 1150 is in an automobile can be hard iron is a permanent magnet of the loudspeaker in a car entertainment system. It is primarily desired to determine the heading of the level car itself, and the heading of the e-compass is an intermediate matter. The e-compass 1150 may be mounted with a physical tilt $\Omega_1$, such as due to assembly variations in automotive manufacturer or retrofit installation of the e-compass, and Equation (2.2) applies. In other words, it is desired to compensate for the physical tilt $\Omega_1$ of the e-compass relative to the car (or handheld portable device in other examples), and therefore the e-compass is graphically de-rotated by the electronic process relative to the hard iron M. Accordingly, the hard iron component M is graphically affected by the rotation, as discussed earlier herein above.

$$H^{m'}=S_C*\Omega_1*(D*H+M_0). \qquad (2.2)$$

An alternative process segment involving below Equation (5.1) is useful, for instance, when the e-compass 1150 is in an automobile and the hard iron is a permanent magnet of the loudspeaker in a car entertainment system. When it desired to determine the heading of the car on a hill wherein the car itself is tilted according to a physical tilt matrix $\Omega_2$ that is distinct from the possible physical tilt $\Omega_1$ of the e-compass relative to the car. The e-compass 1150 is securely mounted relative to the rest of the car, and the hard iron is securely mounted also.

In such case the physical tilt $\Omega_2$ of the car on the hill is eliminated by de-rotation as in Equations (5.3) and (23) using the hard iron coordinates M (ellipsoid center) as pivot point because the hard iron is unchanging with tilt as in Equation (5.1).

Tilt $\Omega_2$ directly affects the orientation of the e-compass sensors relative to the Earth's 3D magnetic field D*H impinging on the e-compass sensors. However, the hard iron magnetic field in relation to the e-compass sensors is independent of the 3D tilt $\Omega_2$, (e.g., tilted car). Tilt $\Omega_2$ pre-multiplies the Earth's magnetic field and post-multiplies the sensitivity matrix $S_C$ in Equation (5.1). Compare with Equation (5) earlier herein above.

$$H^{m'}=S_C*\Omega_2*D*H+M. \qquad (5.1)$$

Solving Equation (5.1) for the Earth's 3D magnetic field yields Equation (5.2).

$$D*H=\Omega_2^{-1}*S_C^{-1}*(H^{m'}-M) \qquad (5.2)$$

To further deal with the more complex case involving the relationship of physical tilt $\Omega_2$ to graphical tilt, it is useful now to rewrite the full matrix equation for a three-dimensional (3D) ellipsoid using equation (5.2) when the e-compass is physically tilted according to physical tilt matrix $\Omega_2$:

$$(H^{m'}-M)^T S_C^{-1T}*\Omega_2^{-1T}*\Omega_2^{-1}*S_C^{-1}*(H^{m'}-M)=\|D*H\|^2 \qquad (17)$$

Like Equation (16), Equation (17) expresses the constancy of the magnitude $\|D*H\|$ of Earth's 3D magnetic field vector in the locality of the e-compass, but this time regardless of the tilted e-compass 3D measurement sensor vector $H^{m'}$ and disregarding the hard iron magnetic disturber M and disregarding any soft iron.

Following the general approach described earlier herein above, the 3D analysis here recognizes that the precise matrix entry values of tilt $\Omega_2$ are unknown but are approximated by accelerometer tilt-sensor-based matrix Zeta $\zeta$. The as-yet undetermined approximation error as between physical tilt $\Omega$ and tilt-sensor-based matrix Zeta $\zeta$ is $\zeta^{-1}*\Omega_2$, the same as expressed in Equation (6). Note that physical tilt $\Omega_2$ in terms of tilt-sensor-based matrix Zeta $\zeta$ and its approximation error then is $$\Omega_2=\zeta*(\zeta^{-1}*\Omega_2) \qquad (18)$$

Substituting Equation (18) into Equations (5.2) and (17) establishes the respectively equivalent forms (5.3) for Earth's magnetic field and (17.1) for the 3D ellipsoid expressing constancy of magnitude.

$$D*H=(\zeta(\zeta^{-1}\Omega_2))^{-1}*S_C^{-1}*(H^{m'}-M) \qquad (5.3)$$

$$(H^{m'}-M)^T S_C^{-1T}*(\zeta*(\zeta^{-1}*\Omega_2))^{-1T}* (\zeta(\zeta^{-1}*\Omega_2))^{-1}*S_C^{-1}*(H^{m'}-M)=\|D*H\|^1 \qquad (17.1)$$

Note however, that the use of the Zeta matrix in equation (17.1) is as if Zeta were a physical rotation itself. Indeed, Zeta is measured by the tilt sensor were accelerometer 1140 as a physical measurement. However, when used for coarse detilting of e-compass sensor data, Zeta is used for graphical detilting. It remains to be seen whether graphical rotation occupies the same place in the matrix equations. At this point, it remains to express equation (17.1) in terms of a 3D rotation matrix R that graphically tilts or detilts an ellipsoid. Recall that FIGS. 4-7 have 2D x,y-coordinate axes for actual e-compass sensor measurements $H^{m'}$. The ellipsoid of Equation (17.1) is also expressed in terms of actual e-compass sensor measurements $H^{m'}$ except that they are in 3D. Rotating the ellipsoid graphically in 3D means applying a coordinate transformation matrix, or rotation matrix R. Mathematically, an appropriate point around which the rotation is applied is now selected, called a pivot point herein.

Note that two different pivot points for processes of de-rotation might be:

Origin: rotation of the ellipsoid center pivoting around the origin (0,0) in 2D or (0,0,0) in 3D. This type of rotation is effectuated by substituting the matrix product $R*H^{m'}$ in place of the sensor measurement points $H^{m'}$. Because the sensor measurement points $H^{m'}$ have the origin as their distance-zero point, the matrix product $R*H^{m'}$ represents rotation around the origin.

Ellipsoid center or ellipse center: rotation of the ellipsoid or ellipse around its own center, e.g., by a 2D angle $(-\xi)$ pivoting around the ellipse center (X0, Y0). This type of rotation is effectuated by substituting the matrix product $R*(H^{m'}-M)$ in place of the sensor measurement points $(H^{m'}-M)$ referred to the center. It is not unreasonable to suppose a pivot point P=M at the ellipse center because the 2D tilt angle $\xi$ is also the angle of the ellipse major axis with a line through the ellipse center parallel the x-coordinate axis. Moreover, hard iron M is unaffected by physical tilt, so there is no reason to think that rotation should affect a measurement $H^{m'}=M$ hypothetically taken in the absence of the Earth's magnetic field. The effect of hard iron is removed by substituting the matrix product $R*(H^{m'}-M)$ in place of the sensor measurement points $(H^{m'}-M)$ referred to the ellipse center.

In Equation (10), the Origin (0,0) point "1" above is implicitly adopted as the pivot point for de-rotation. That the origin is the point adopted is evident because a rotation matrix to rotate in 2D by $(-\xi)$ is applied directly to the coarsely detilted coordinate values $H_x^{m''}$, $H_y^{m''}$ in FIG. 6 to go to FIG. 7. This process segment is useful, for instance, when the e-compass 1150 is in an automobile can be hard iron is a permanent magnet of the loudspeaker in a car entertainment system, as already mentioned, and it is primarily desired to determine the heading of the level car itself, and the heading of the e-compass is an intermediate matter. In such case the tilt $\Omega_1$ is eliminated by de-rotation through an angle $\xi_1$ as in Equation (10) using the origin (0,0) as pivot point. In other words, it is desired to compensate for the physical tilt $\Omega_1$ of the e-compass relative to the car (or handheld portable device in other examples), and therefore the e-compass is graphically de-rotated by the electronic process relative to the hard iron M.

In some other embodiments, the ellipsoid center (pivot point "2" above) is selected as the pivot point. Desirably, the effect of hard iron is removed by substituting the matrix product $R*(H^{m'}-M)$ in place of the sensor measurement points $(H^{m'}-M)$ referred to the ellipse center. This alternative process segment is also useful, for instance, when it is primarily desired to determine the heading of the car on a hill wherein the car itself is tilted according to a physical tilt matrix $\Omega_2$ that is distinct from the physical tilt $\Omega_1$ of the e-compass relative to the car. In such case the physical tilt $\Omega_2$ of the car on the hill is eliminated by de-rotation as in Equations (5.3) and (23) using the hard iron coordinates M (ellipsoid center) as pivot point. In other words, it is desired to compensate for the physical tilt $\Omega_2$ of the car, and therefore the e-compass is graphically de-rotated through a tilt angle $\xi_2$ by the electronic process, and in the reference frame of the e-compass the hard iron is unchanging. Accordingly, the hard iron component is not graphically affected by the rotation.

In a third type of embodiment, both these process segments are combined. Calibration provides a measured physical tilt $\zeta_1$ and a first tilt angle $\xi_1$ for the tilted e-compass relative to the car, with the car level, to correct for the physical tilt $\Omega_1$. Coarse de-tilting, if used, first applies $\zeta_1^{-1}$ per Equation (6) prior to de-rotating by first tilt angle $\xi_1$. Calibration then provides a second tilt angle $\xi_2$ with the car itself tilted to correct for the physical tilt $\chi_2$. Post-calibration heading determination first de-rotates around the origin using first tilt angle $\xi_1$ to compensate for the physical tilt $\Omega_1$ of the e-compass relative to the car. Then the post-calibration process, secondly, de-rotates around the ellipse center M using second tilt angle $\xi_2$ to compensate for the physical tilt $\Omega_2$ of the car on a hill. Note that overall physical tilt $\Omega$ is the product $\Omega_2\Omega_1$. In post-calibration use with the car itself tilted, the measured physical tilt $\zeta_m$ from accelerometer 1140 is a composite $\zeta_2 * \zeta_1$, and so, for the second coarse de-tilt pre-multiply by $\zeta_2^{-1} = (\zeta_m^{-1} * \zeta_1)$ prior to secondly de-rotating around the ellipse center M using second tilt angle $\xi_2$. In this way, various process embodiments robustly provide more accurate e-compass heading measurement for a variety of products and physical conditions of manufacture and use.

Description continues here with analysis using the ellipsoid center M as the pivot point for detilting the tilt $\Omega_2$. Apply a 3D graphical rotation R after first performing coarse detilting by a graphical rotation $\zeta^{-1}$ on the e-compass ellipsoid using expression (17.2).

$$(H^{m'}-M)^T \zeta^{-1T} * R^T * S_C^{-1T} * S_C^{-1} * R * \zeta^{-1} * (H^{m'}-M) = \|D*H\|^2 \quad (17.2)$$

Now determine what, if any, 3D graphical rotation R, thus applied, is equivalent to that of fully compensated ellipsoid in Equation (17.1):

$$(H^{m'} - M)^T \zeta^{-1T} * R^T * S_C^{-1T} * S_C^{-1} * R * \zeta^{-1} * (H^{m'} - M) = \quad (17.3)$$
$$(H^{m'} - M)^T S_C^{-1T} * (\zeta*(\zeta^{-1}*\Omega_2))^{-1T} *$$
$$(\zeta*(\zeta^{-1}*\Omega_2))^{-1} * S_C^{-1} * (H^{m'} - M) = \|D*H\|^2$$

Evidently, to establish that equivalent relationship (17.3) between expression (17.2) and equation (17.1), $$S_C^{-1} * R * \zeta^{-1} * (H^{m'}-M) = (\zeta*(\zeta^{-1}*\Omega_2))^{-1} * S_C^{-1} * (H^{m'}-M) \quad (19)$$

and $$S_C^{-1} * R * \zeta^{-1} = (\zeta*(\zeta^{-1}*\Omega_2))^{-1} * S_C^{-1} \quad (20)$$

Solving for rotation matrix R yields $$R = S_C * (\zeta^{-1}*\Omega_2)^{-1} * \zeta^{-1} * S_C^{-1} * \zeta \quad (21)$$

Notice that all the matrices in Equation (21) are 3×3 square, and in the special case wherein the sensitivity matrix is diagonal, which is reasonable in most practical scenarios, cancellations occur and the rotation matrix is about the same as the inverse of the approximation error of physical tilt sensor matrix $\zeta$ to actual physical tilt $\Omega$:

$$R \sim = (\zeta^{-1}*\Omega_2)^{-1} \quad (21.1)$$

In some embodiments and applications, the actual physical tilt $\Omega_2$ is known to be small, and so the identity matrix I is a good approximation $\zeta$ to actual physical tilt $\Omega_2$. Substituting identity matrix I in place of estimated tilt matrix $\zeta$ in equation (21.1) establishes that the rotation matrix R should itself be equal to the inverse $\Omega_2^{-1}$ of the physical tilt. Then Equation (22) is used directly without accelerometer 1140 or tilt sensor input.

In 3D, rotation matrix R is a 3×3 matrix. Some embodiments perform 2D ellipse fitting as in FIG. 6 to recover the tilt angle $\xi_2$ to cancel physical tilt $\Omega_2$ using Equation (22). The a, b, c matrix entries involve one or more tilt angles $\xi_2$ for XY, XZ, YZ and track Equations (7a), (7b), (7c).

$$(\zeta^{-1}*\Omega_2)^{-1} = \begin{bmatrix} 1 & -a & -b \\ a & 1 & c \\ b & -c & 1 \end{bmatrix} \quad (22)$$

E-compass heading information is embedded in matrix D*H, which is recovered for any given calibration point, or in a post-calibration heading measurement process by using part of Equation (19) rewritten next as Equation (23):

$$D*H = S_C^{-1} * R * \zeta^{-1} * (H^{m'}-M) \quad (23)$$

The heading angle $\psi$ is computed using Equation (4) based on the results of Equation (23).

Description next turns to the topic of systems combining e-compass and navigation applications. Some embodiments include inertial navigation based on a miniature Gyro 1170 that has small dimensions on the order of 1 cm or less for portable applications. Gyro 1170 establishes an inertial reference with respect to which acceleration can be directly measured by an accelerometer 1140 in inertial coordinates. Some embodiments include inertial navigation without Gyro 1170 and additionally utilize heading information from the e-compass 1150 together with accelerometer 1140 outputs as discussed next.

A classical inertial navigation system (INS) technology is based on gyroscope 1170 and accelerometer 1140 sensors. For example, accelerometer 1140 can be assembled together with three miniature, perpendicular-mounted gyroscopes pivoted on gimbals and thus provide an inertial platform that maintains pre-established directions of accelerometer sensor axes no matter how a vehicle moves, rotates, or generally changes direction of motion due to yaw, pitch and roll. By contrast, e-compass has a miniature form factor and potentially low cost and can find its own space of application.

In recent years with the advent of MEMS e-compass (micro-electromechanical system electronic compass) technology it is now possible to achieve convenient, low-cost electronic compassing in consumer and commercial portable applications. MEMS based accelerometers 1140 and e-compasses 1150 are low cost feasible options to provide navigation assistance to GPS for short durations. With GPS now available on cell phones 2010 an IMU (Inertial measurement unit) having e-compass and accelerometers can increasingly share the cell phone market for GPS-assisted applications as well.

A MEMS accelerometer 1140 can be held stationary relative to the Earth's surface or held stationary in a vehicle 2095 moving in a constant velocity in a straight line. Calibration of the MEMS accelerometer beneficially takes advantage of the constancy of direction and magnitude of gravitational acceleration vector g as illustrated in FIG. 3. The MEMS accelerometer measures tilt with respect to the vertical. Any position in a cone-shaped set of orientations has identical tilt with respect to the vertical (direction of g) and yields the same accelerometer sensor outputs in the device reference frame.

These different orientations, however, have different headings or directions relative to the Earth's magnetic field vector H as shown in FIG. 3. The Earth's magnetic field vector H has constant direction and may also have constant magnitude over a substantial distance and over a period of time, that a portable device or platform can be moved, subject to certain qualifications as discussed more fully herein. In other words, the Earth's magnetic field H has the same direction in a locality, independent of rotation, acceleration or other motion of the portable device. The e-compass 1150 has sensors that can beneficially measure the intensity and direction of the Earth's magnetic field vector H. The gravitational acceleration vector g and the Earth's magnetic field vector H have substantially distinct directions, so they define a geometric plane which has a third vector H×g perpendicular to the plane (where operation x signifies vector cross product) and pointing horizontally East relative to magnetic North. The three vectors g, H, H×g constitute a sufficient, but generally non-orthogonal, set of basis vectors to establish a coordinate system. Moreover, as depicted in FIG. 3, an orthogonal set of basis vectors is established by the set of three vectors {(g× H)×g, g×H, g} wherein the basis vector (g×H)×g points horizontally to magnetic North, the basis vector g×H points horizontally East, and the basis vector g points vertically down. This set of orthogonal basis vectors also constitutes a North-East-Down (NED) coordinate system.

Portable device embodiments with MEMS accelerometer and MEMS e-compass and processor operable as described herein thereby establish convenient, low-cost inertial platform with basis vectors analogous to the basis vectors established by three gyroscopes in a Gyro 1170 supported inertial platform. Notice that, in general, the basis vectors g and H do not need to be perpendicular for satisfactory programming and operation of embodiments herein with MEMS accelerometer and MEMS e-compass and processor.

A MEMS accelerometer is suitably calibrated to measure gravitational acceleration by any suitable method such as any method disclosed in US patent application titled "Parameter Estimation for Accelerometers, Processes, Circuits, Devices and Systems" Ser. No. 12/398,775 (TI-65353) filed on even date herewith, and said U.S. patent application is incorporated herein by reference in its entirety.

At run-time after calibration, the accelerometer sensor outputs of the tilted device or platform are processed by any processor in system 1700 of FIG. 2 to deliver a measured tilt angle of the device or platform as discussed elsewhere herein. Notice that the accelerometer sensors are mounted substantially perpendicular to one another and thereby define substantially perpendicular axes that constitute the accelerometer reference frame that is securely affixed to the portable device as a whole. The accelerometer sensor outputs accordingly deliver measured acceleration components relative to the accelerometer reference frame. The accelerometer reference frame is distinct from NED frame.

Heading information from the e-compass is suitably used herein to convert the acceleration relative to the accelerometer reference frame to acceleration in a NED reference frame. In this way, the accelerometer plus e-compass provides positioning that can be combined or blended with GPS information and provide a low-cost, miniature inertial platform alternative to gyroscope-and-accelerometer inertial systems. GPS information is blended with either or both of accelerometer and/or e-compass in some of the embodiments.

For navigation about the local NED frame, notice that the e-compass 1150 sensors are used to represent the magnetic field vector H in the reference frame of the e-compass in a way analogous to the way the gravitational acceleration vector g is determined by processing for the accelerometer 1140 data in incorporated patent application Ser. No. 12/398,775 (TI-65353). Accordingly, detilting does not need to be used at this point since determination of heading $\psi$ is not involved at this point of the process. The magnetic field vector H is established in the reference frame of the e-compass 1150, and the gravitational acceleration vector g is established in the reference frame of the accelerometer 1140 that is rigidly related to the e-compass 1150. Consequently, a NED reference frame is then readily determined by electronically executing the vector cross products defining that NED reference frame.

In this way, a fully solid-state navigation system is provided. Even in systems having gyro 1170, operations using the solid-state INS approach contribute to power savings through smart power management that temporarily, selectively and intelligently powers down and powers up different parts of the entire system to accomplish the system functions in an optimally power managed way. Of course, the presence of hard iron and potential soft iron disturbers should be accounted for in the electronic processing. The hard iron is calibrated out as taught herein. Soft iron is detected and processed out by using the processor and memory to electronically maintain a history of magnetic field measurements over a long enough period of time for magnetic fields variations due to soft iron to be detected and prevented from corrupting the measurements of the Earth's magnetic field vector H.

For position sensing, even across rather extensive portions of the Earth from the viewpoint of a portable device, GPS can provide updates to correct the positions and the e-compass calibration is occasionally updated. Accordingly, for portable applications it is reasonable to assume a constant direction of the magnetic field vector H over the range of motion of the portable device since a sufficiently-recent calibration in a given locality, and subject to hard iron and soft iron processing.

Embodiments of method and system herein remove the necessity of accurately orienting the e-compass 1150. Instead, e-compass 1150 readings at rest in different, imprecise or unspecified, freely-establishable orientations are conveniently taken. Precise or specific postures need not be prescribed nor relied upon while taking these readings. The cell phone 2010, PDA 2096, or other portable device can be placed in different orientations of FIG. 10.

Various embodiments work on the datasets signaled by e-compass 1150 at different imprecise, unspecified, non-specific or unknown orientations and nevertheless can estimate and use best-fit values for various accelerometer parameters, such as the axes gains, hard iron offsets Mx, My, Mz, tilt angle $\xi$, etc. Various technology types of e-compass 1150 sensors can be employed.

Figure 12:
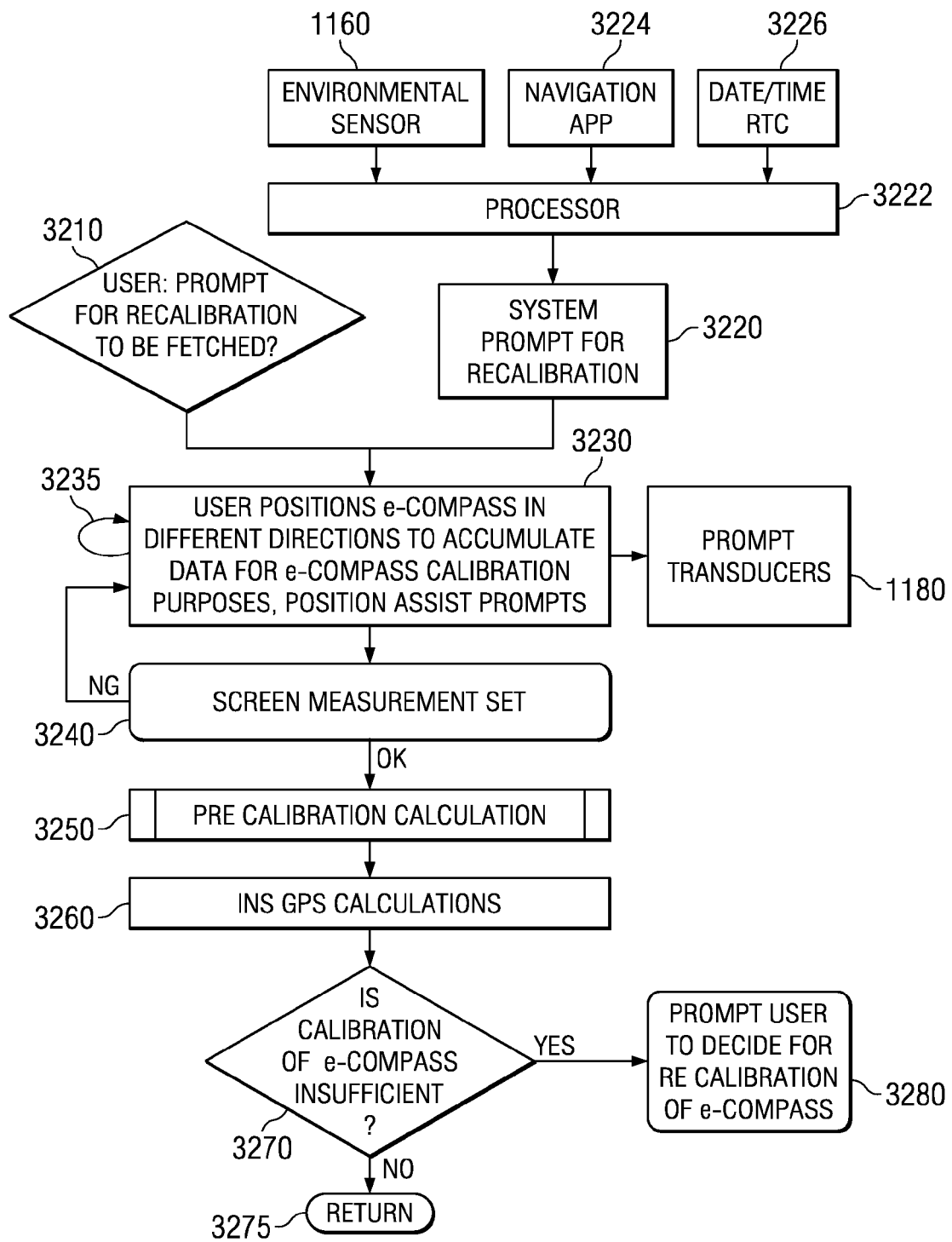
FIG. 12 is a flow diagram of an inventive process and structure for obtaining e-compass data for calibration purposes and determining whether recalibration is recommended.

In FIG. 12, operations in this convenient approach commence in response to a step 3210 wherein the user clicks an icon, or recalibration item on a menu display of the portable device, or otherwise prompts a fetch of recalibration software as improved herein. Calibration of the e-compass 1150 can be performed before deploying a particular post-calibration application, e.g., heading determination and/or Inertial Navigation assisted vehicle navigation and/or Pedestrian Navigation. Also, a parallel step 3220 responds to any internal prompt from the system software requesting recalibration software operation. Any of a suite of navigation applications 3224 can request e-compass 1150 recalibration on processor 3222, or the operating system software or driver can call for recalibration when a navigation application is about to be launched. If substantial time has passed since last recalibration, as measured by Date/Time RTC 3226, or the e-compass 1150 has never been calibrated as indicated by calibration parameters set to their original initialization values, then an internal flag is set for processor 3222 to generate an internal prompt. A substantial change in the environment, such as a temperature change or voltage regulator voltage change, or other change, detected by environmental sensor(s) 1160 can also trigger a recalibration request.

A succeeding step 3230 cues the user such as by display messages and/or audible instructions calling for the user to position or rotate the e-compass 1150 in different orientations or directions to accumulate data for calibration purposes. Various position assist prompts are suitably given to the user to clarify and facilitate the measurement process. The orientation changes and arrows are applicable to any of the portable devices like PDA/PEU 2096, cell phones 2010 and 2010', vehicle device 2095, etc.

During calibration phase for hard iron, the portable device containing the e-compass is rotated in random circles (for 2D calibration) or, in randomized spherical fashion (for 3D calibration). The portable device is programmed to cue the user with a beep and/or flash when a measurement set is to be taken. Once sufficient data has been gathered a good hard iron calibration has been achieved, the prompt transducer 1180 issues a beep-beep and/or double flash to signal the end of calibration. A single cueing beep can be issued as a reminder if the dataset over a modest interval of time is insufficient to achieve a good hard iron calibration.

In step 3240 of FIG. 12, the measurement set is screened or checked for credibility. For instance, operations check for massive data outliers (soft iron) in step 3240. Step 3420 tests whether the data as a whole is close to lying on an ellipse that could be fitted thereto (OK), or not close (NG). If not close (NG), operations discard the measurements or at least the irrelevant outliers, cue the user or tester and, if necessary to get sufficient good data, go back from step 3240 to step 3230 to acquire a satisfactory data set.

A further step 3250 performs a calibration calculation of the parameters of the e-compass 1150, such as offsets M and axes gains $S_C$ for each of the three e-compass sensors X, Y, Z that best fit with the measurements. A step 3260 performs position sensing calculations that blend the e-compass 1150 information (INS) and GPS position information as in FIG. 13. Then a decision step 3270 determines whether the accuracy of calibration is insufficient as indicated by any substantial unexpected inaccuracy, trend, or drift in position measurement. At first, decision step 3270 determines that the accuracy is sufficient, goes to RETURN 3275, and proceeds to perform navigation applications 3224 upon user command or otherwise when launched. However, with passage of time, or with substantial and prolonged temperature changes, or some other factor, decision step 3270 can determine that recalibration is called for, whereupon operations proceed to a step 3280 to prompt the user to decide for recalibration and go to step 3220 or 3210.

Figure 13:
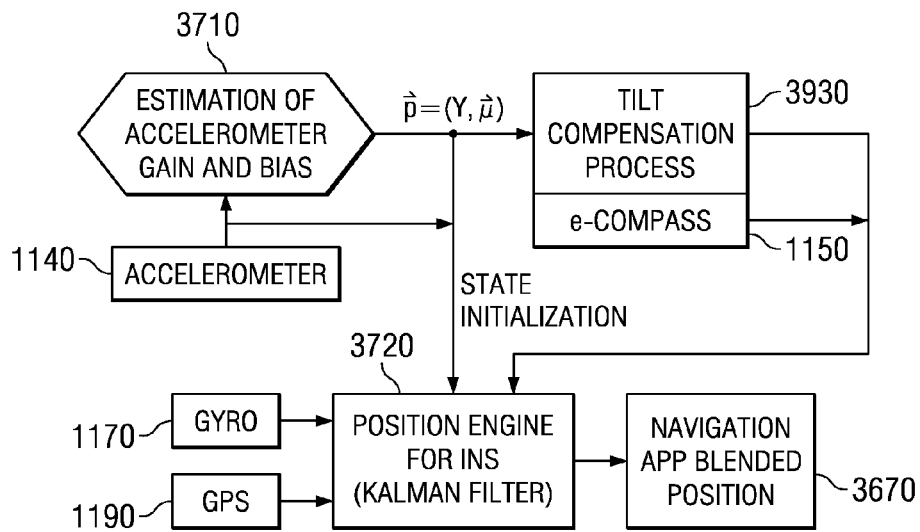
FIG. 13 is a block diagram of an improved navigation system utilizing the improved processes of FIG. 9 and FIG. 11.

In FIG. 13, smart phones 2010 and 2010', such as in third-generation (3G) phone category can include Inertial Navigation as a beneficial navigation feature using MEMS (microelectromechanical structure) 3-axis accelerometer 1140, gyros and e-compass 1150. MEMS accelerometers are low cost, low power devices that are quite useful in inertial navigation providing information on acceleration along its axes as well as performing as tilt sensors. Inertial navigation for vehicular navigation is however susceptible to accelerometer bias errors and gain errors. The velocity (speed) and the distance traversed by a vehicle 2095, or in pedestrian navigation, are obtained by integrating the accelerometer 1140 output once and twice respectively. Accelerometer 1140 sensor error and e-compass 1150 sensor error, if not compensated appropriately, can produce over time a significant error in velocity and displacement due to time-integration (e.g., see equation (30) described later hereinbelow).

FIG. 13 shows an embodiment of structure and process for using accelerometer gain parameter estimates Yxx, Yyy, Yzz and bias parameter estimates μx, μy, μz included in parameters p in a position engine. In FIG. 13, a step 3710 provides estimation of accelerometer gain and bias by calibration or recalibration according to any of the process embodiments described in the incorporated patent application Ser. No. 12/398,775, TI-65353.

In FIG. 13, a position engine 3720 is provided to receive GPS (Global Positioning System) and accelerometer (Inertial INS) measurements and then blend the inertial output with GPS measurements obtained by a GPS engine 1190 in FIGS. 1-3. Conveniently calibrated MEMS accelerometers 1140 along with e-compass 1150 and/or gyro 1170 herein provide a seamless navigation experience to end users even when GPS visibility is absent or poor, such as when the environment is severely affected by multi-path propagation. Such recalibration thereby delivers a very attractive value-add to GPS-enabled portable devices such as those of FIG. 1 and others described herein. Estimation of accelerometer and e-compass parameters improves runtime acceleration measurement accuracy and dead reckoning of position in the absence of GPS, as well as usefully blending with GPS when GPS has moderate or poor quality. The recalibration processes, circuits, devices, and systems taught herein can be accurate, reliable, and easy to use.

Accurate parameter estimates of a given INS system including accelerometer 1140 and Gyro 1170 and e-compass 1150 help to define the state initialization for a position engine 3720 that combines GPS input and INS outputs. Accelerometer parameters 3710 are applied to Tilt Compensation Process 3930 in FIG. 13 to calibrate e-compass 1150 and/or Gyro 1170 according to any of the tilt compensation embodiments taught herein.

A concept of blending is motivated by a process for combining information that adds a most-recent GPS position $x_{gps}$ and velocity $v_{gps}$ to twice-integrated corrected acceleration in navigation frame according to equation (30):

$$x_{blend}(t) = x_{gps} + (t - t_{gps})v_{gps} + \int_{t_{gps}}^{t}\int_{t_{gps}}^{t} C*[g - Y*(f^m - \mu)]dt\,dt \qquad (30)$$

In equation (30), the double-integral performs definite integration twice of the computed actual acceleration with respect to time t, starting with the time $t_{gps}$ of a most-recent GPS vector position measurement $x_{gps}$ and most-recent vector velocity measurement $v_{gps}$. The blended vector position output $x_{blend}(t)$ from position engine 3720 pertaining to a given time t is the sum of the most-recent GPS vector position measurement $x_{gps}$ (GPS input of FIG. 13) added to the product of vector velocity $v_{gps}$ times time since last velocity measurement, and further added to the double-integral of the estimated true acceleration in the NED frame in FIG. 13. The measured accelerometer sensor inputs $f^m$ are corrected by a processor in FIG. 1 or 2 applying gain parameter estimates Yxx, Yyy, Yzz and bias parameter estimates μx, μy, μz from step 3710 as shown in equations (30) and (31). The accelerometer measures the gravity vector g with the device or platform at rest, so the acceleration of the device itself is the difference between gravity vector g (essentially unity 1.00) and the compensated measurement $Y*(f^m-\mu)$ is expressed in the integrand.

The e-compass 1150 measures the magnetic vector H, which supports conversion of the acceleration vector for the device itself into the NED frame. A (3×3) matrix C is established of direction cosines of the device reference frame unit vectors in directions X, Y, Z relative to the unit vectors for the NED frame. The direction cosines for (3×3) matrix C are computed by taking the vector inner product of each of the unit vectors for the NED frame with each of the unit vectors of the device reference frame unit vectors, thus producing the nine direction cosines. Conversion of the device acceleration vector $[g-Y*(f^m-\mu)]$ expressed in terms of the device reference frame into the locally-inertial frame is performed by a matrix multiplication of the matrix C of direction cosines times $[g-Y*(f^m-\mu)]$.

A most recent velocity input $v_{gps}$ is added to integrated corrected acceleration according to equation (31) to obtain blended velocity $v_{blend}(t)$:

$$v_{blend}(t) = v_{gps} + \int_{t_{gps}}^{t} C*[g - Y*(f^m - \mu)]dt \quad (31)$$

For greater position accuracy, and to remove the effects of statistical error in various measurements, multiple GPS vector position measurement $x_{gps}$ over occasional times and/or multiple computed actual acceleration measurements over independently-occasional time in some embodiments are instead combined using a Kalman filter for position engine 3720. Kalman filter processing of time sequence data need not be tediously described here. The point for the purposes of the present description is that a well-defined state initialization is provided by step 3710 with gain parameter estimates Yxx, Yyy, Yzz for the accelerometer and analogous gain parameters for the e-compass, as well as bias parameter estimates µx, µy, µz for the accelerometer and offset parameter estimates Mx, My, Mz for the e-compass. Thus, step 3710 facilitates quick convergence or settling of a Kalman filter for position engine 3720 such as in Inertial Navigation INS applications. In this way, position engine 3720 usefully supplies a blended position output for display or further analysis and use by the navigation application 3670 (2524).

Figure 14:
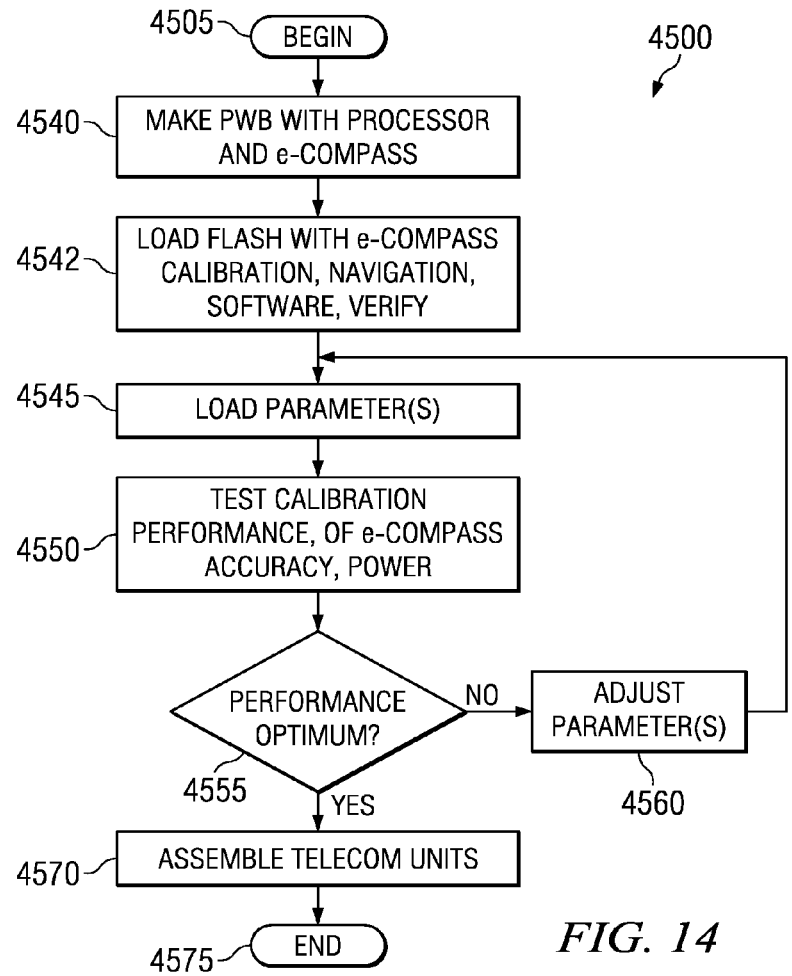
FIG. 14 is a flow diagram of an inventive process of manufacturing the inventive systems shown in other Figures.

In FIG. 14, various system embodiments as described herein are manufactured in a process 4500. Step 4540 provides a particular design and printed wiring board (PWB) of the system 1700 unit having one or more integrated circuits, such as for a modem, a processor coupled to a modem, a controlled power management circuitry, one or more peripherals coupled to the processor, and a user interface coupled to the processor. In steps 4542 and 4545 a storage, such as SDRAM and Flash memory for coupling to on-chip memory, is coupled to the system and has configuration software and initialization parameters according to any of FIGS. 4-14 for an e-compass 1150, as well as navigation applications and other system software.

Step 4550 tests operations of the e-compass 1150 and other circuits by confirming rapid and accurate e-compass parameter estimation and measurement corrections, and operations of the integrated circuit(s) and system in actual application. SoC (system on chip) performance and power consumption with processes from any of FIGS. 4-14 and various alternative estimation processes can be compared at the development phase and the most desirable estimation processes selected for a given system. Various embodiments taught herein are respectively attractive for different types of systems at low, medium and high-end performance/marketing points.

In step 4550, verification and test operations are applied pertaining to real-time and non-real-time e-compass based operations in navigation applications such as location-based applications, position sensing, velocity sensing, directional heading applications, etc. Other test operations involve power management, various real-time scenarios, system stability and performance, satisfactory operation of video display for continuity of content, phone, emails/data service, web browsing, voice over packet, content player for continuity of content, camera/imaging, audio/video synchronization, and other such operation that is apparent to the human user and can be evaluated by system use. Also, various security attack scenarios are applied.

Step 4560 adjusts supporting parameters of the e-compass 1150 circuitry, the e-compass calibration software, and the system for faster calibration and navigation application execution, lower power/energy dissipation, and maintained or enhanced QoS (quality of service). Supporting parameters include enable/disable register bits, parameter registers bit lengths, measurement set screening range, data outlier distance d, FIG. 12 RTC gating elapsed-time intervals for enabling calibration, environmental sensor thresholds and ranges for initiating a call for calibration, and any other supporting parameters involved in processes described hereinabove. If further increased efficiency or accuracy is called for in a step 4555, then step 4560 adjusts or reconfigures parameter(s) and safety margins and loops back to reload parameter(s) at step 4545 and do further testing. When satisfactory at step 4555, operations proceed to step 4570, where adjusted parameter(s) are loaded into the Flash memory or otherwise by system manufacturer or a supplier, and components are assembled on PWB in volume manufacturing to produce resulting system units and END 4575 is reached.

Various embodiments are used with one or more processors that perform electronic processes on signals representing the e-compass data and generate processor signals representing recalibrated parameters and corrected magnetic vectors. Processors perform signal processing according to instructions and by actual electronic processes that represent or correspond to the various matrix operations disclosed herein. Memory circuits hold physical representations of instructions and parameters. In various embodiments, the e-compass 1150 is a physically compact device including 1) a set of MEMS e-compass sensors, 2) the e-compass sensors combined with a nonvolatile memory holding calibration software and/or parameters as described herein, 3) the e-compass sensors combined with a microprocessor for the e-compass 1150 as well as nonvolatile memory holding the calibration software and/or parameters, 4) e-compass 1150 combined with accelerometer 1140 or tilt sensor and any of the other embodiments and further having tilt compensation software and parameters, 5) position sensing (e.g., GPS) unit combined with any of the other embodiments and further having GPS software and parameters, and/or 5) a high-performance applications processor SoC integrated circuit for supporting plural applications, and having either integrated therein or coupled thereto any of the other embodiments and/or holding any of the software and/or parameters, or 6) other suitable assembly.

Manufacturing process operations for making integrated circuit chips are applied, such as for subsequent use in system integration of FIG. 14. RTL (register transfer language) design code represents the hardware of any part or all of FIGS. 2 and 3, and prepares software code according to any of FIGS. 4-14 and/or as described herein to run on the hardware as well. Chips are fabricated in a wafer fab, and serial-scan testing of scan able registers and other testing is performed using emulation EMU of FIG. 2 on the manufactured integrated circuits.

Because of the electronic operations representing matrix operations described earlier hereinabove, a processor with one or more fast multiply-accumulate units provides desirably high performance in some embodiments. Each processor can have a pipeline for high performance and selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

APPENDIX I

Generating Tilt Matrix $\Omega$ from Accelerometer Data

A body at rest at a perfectly horizontal position experiences a gravity vector $$f=g*[0\ 0\ 1]^T. \qquad (A1-1)$$

With a Roll ($\theta$) the measurement in the Rolled frame is given by:

$$f^R = R * f; \qquad (A1-2)$$

$$R = \begin{bmatrix} 1 & 0 & 0 \\ 0 & \cos\theta & -\sin\theta \\ 0 & \sin\theta & \cos\theta \end{bmatrix} \qquad (A1-3)$$

With a further Pitch ($\phi$) the measurement in a frame herein called the Rolled-Pitched RP frame is given by:

$$f^{RP} = P * f^R = P * R * f; \qquad (A1-4)$$
wherein $$P = \begin{bmatrix} \cos\varphi & 0 & \sin\varphi \\ 0 & 1 & 0 \\ -\sin\varphi & 0 & \cos\varphi \end{bmatrix} \qquad (A1-5)$$

Then an actual physical tilt $\Omega$ is expressed by:

$$\Omega = P*R = \begin{bmatrix} \cos\varphi & (\sin\varphi\sin\theta) & (\sin\varphi\cos\theta) \\ 0 & \cos\theta & -\sin\theta \\ -\sin\varphi & (\cos\varphi\sin\theta) & (\cos\varphi\cos\theta) \end{bmatrix} \qquad (A1-6)$$

$$f^{RP} = g*[(\sin\varphi\cos\theta) \ -\sin\theta \ (\cos\varphi\cos\theta)]^T \qquad (A1-7)$$

$$f_x = g(\sin\varphi\cos\theta); \qquad (A1-8)$$

$$f_y = g(-\sin\theta); \qquad (A1-9)$$

$$f_z = g(\cos\varphi\cos\theta) \qquad (A1-10)$$

$$\varphi = \arctan(f_x/f_z); \qquad (A1-11)$$

$$\theta = \arctan\begin{pmatrix} -\sqrt{2}\sin \\ (\Pi/4+\varphi) \\ f_y/(f_x+f_z) \end{pmatrix} = \arctan(-f_y/\sqrt{(f_x+f_z)}) \qquad (A1-12)$$

Further tilt computation information on the small error angles equation (7) is given in Appendix II.

APPENDIX II

Deriving $\zeta^{-1}*\Omega$ Assuming Small Error Angles

Tilt Estimation and error analysis is more fully written out here:

Estimate of Pitch Angle: $\phi\hat{}=\phi+d\phi$ $\qquad$ (A2-1)

Estimate of Roll Angle: $\theta\hat{}=\theta+d\theta$ $\qquad$ (A2-2)

Define tilt estimate matrix P$\hat{}$ so that pitch angle $\phi\hat{}$ is used in place of angle $\phi$ in Equation (A1-5).

Define tilt estimate matrix R$\hat{}$ so that pitch angle $\theta\hat{}$ is used in place of angle $\theta$ in Equation (A1-3).

Further define:

$$\zeta=P\hat{}*R\hat{} \qquad (A2-3)$$

To first-order, $$P\hat{}=P+(dP/d\phi)d\phi \qquad (A2-4)$$

$$R\hat{}=R+(dR/d\theta)d\theta \qquad (A2-5)$$

$$P\hat{}*R\hat{}\sim=P*R+d(P*R) \qquad (A2-6)$$

$$d(P*R)=P(dR/d\theta)d\theta+((dP/d\phi)d\phi)*R \qquad (A2-7)$$

Perform the calculus differentiations. Assume the errors in estimation of Pitch and Roll angles are small.

$$dR/d\theta == \begin{bmatrix} 0 & 0 & 0 \\ 0 & -\sin\theta & -\cos\theta \\ 0 & \cos\theta & -\sin\theta \end{bmatrix} \qquad (A2-8)$$

$$dP/d\varphi == \begin{bmatrix} -\sin\varphi & 0 & \cos\varphi \\ 0 & 0 & 0 \\ -\cos\varphi & 0 & -\sin\varphi \end{bmatrix} \qquad (A2-9)$$

De-tilted acceleration $\zeta^{-1}*\Omega$ is given by:

$$\zeta^{-1}*\Omega=(P\hat{}*R\hat{})^{-1}(P*R)=R^{-1}(P\hat{}^{-1}*P)*R \qquad (A2-10)$$

Applying Equation (A2-6):

$$\zeta^{-1}*\Omega=(P*R+d(P*R))^{-1}(P*R) \qquad (A2-11)$$

$$\zeta^{-1}*\Omega=[(P*R)*(I+(P*R)^{-1}d(P*R))]^{-1}(P*R) \qquad (A2-12)$$

Applying the matrix-inverse identity $(A*B)^{-1}=(B^{-1}*A^{-1})$ and simplifying, and then applying the first order approximation $(I+A)^{-1}=(I-A)$ gives:

$$\zeta^{-1}*\Omega=I-(P*R)^{-1}d(P*R) \qquad (A2-13)$$

Substituting Equation (A2-7):

$$\zeta^{-1}*\Omega=I-(P*R)^{-1}(P(dR/d\theta)d\theta+((dP/d\phi)d\phi)*R) \qquad (A2-14)$$

Again using the matrix-inverse identity, and simplifying:

$$\zeta^{-1}*\Omega=I-R^{-1}*(dR/d\theta)d\theta-(P*R)^{-1}((dP/d\phi)d\phi)*R \qquad (A2-15)$$

Using the identity (A2-16) to more easily obtain $(P*R)^{-1}$ from Equation (A1-6). Substitute the resulting Equation (A2-17) into Equation (A2-15). Equation (7) results from expanding Equation (A2-15).

$$\begin{aligned}(P*R)^{-1} &= \Omega^{-1} \\ &= R^{-1}*P^{-1} \\ &= R(-\theta)*P(-\varphi) \\ &= R^T*P^T \\ &= (PR)^T \end{aligned} \qquad (A2-16)$$

$$(P*R)^{-1} = \begin{bmatrix} \cos\varphi & 0 & -\sin\varphi \\ (\sin\varphi\sin\theta) & \cos\theta & (\cos\varphi\sin\theta) \\ (\sin\varphi\cos\theta) & -\sin\theta & (\cos\varphi\cos\theta) \end{bmatrix} \qquad (A2-17)$$

APPENDIX III

Ellipse-Fitting Procedure

Fit an ellipse equation of the following form to m measurements k of points x(k), y(k)

$$\rho_1 x^2 + \rho_2 xy + \rho_3 y^2 + \rho_4 x + \rho_5 y + \rho_6 = 0 \tag{A3-0}$$

Define matrices for the m measurements k of points x(k), y(k):

$$D_1 = [x^2(k), x(k)y(k), y^2(k)] \ (m \times 3) \tag{A3-1}$$

$$D_2 = [x(k), y(k), 1] \ (m \times 3) \tag{A3-2}$$

Do QR decomposition of the (m×3) matrix $D_2$ into an (m×m) orthogonal matrix $Q_2$ and an (m×3) upper triangular matrix $R_2$. (Golub and Van Loan, Matrix Computations, $3^{rd}$ ed. 1996 at section 5.2.) Use upper triangular matrix $R_2$ to execute Equation (A3-3).

$$M_{DR} = D_1^T D_1 - (D_1^T D_2)(R_2^T R_2)^{-1}(D_2^T D_1) \ (3 \times 3) \tag{A3-3}$$

$$M2 = \begin{bmatrix} M_{DR}(3, (1:3))/2 \\ -M_{DR}(2, (1:3)) \\ M_{DR}(1, (1:3))/2 \end{bmatrix} (3 \times 3) \tag{A3-4}$$

Establish a (3×3) matrix V from matrix M2 such that:

$$(M2)V = VD \tag{A3-4A}$$

where, D is a diagonal matrix with eigen values of M2 and the columns of V are the eigen vectors of M2.

Generate the row vector c(j) such that for each column j=1, 2, 3:

$$c(j) = 4V(1,j)V(3,j) - V(2,j) - V(2,j) \tag{A3-5}$$

where, V(1,j), V(2,j) and V(3,j) are the row cell values in a given column j of matrix V.

Identify the (3×1) column vector U in matrix V for which the corresponding value of c is positive:

$$U = V(:, c > 0) \tag{A3-6}$$

Generate a (6×1) column vector:

$$[\rho] = \begin{bmatrix} U - (R_2^T R_2)^{-1}(D_2^T D_1) U \end{bmatrix} \tag{A3-7}$$

Pre multiply vector ρ with ±1 to ensure the first entry of ρ vector is always positive.

Compute the tilt angle ξ of the ellipse major axis relative to the x-coordinate axis using values from the vector of ellipse parameters as follows:

$$\xi = 0.5 \arctan[\rho_2/(\rho_3 - \rho_1)] \tag{A3-8}$$

All other ellipse parameters (center coordinates, lengths of major and minor axes) are obtained using column vector ρ.

MATLAB® ELLIPSEFIT(X,Y) is also an example of an ellipse fitting procedure, see mathworks.com.

ASPECTS

See Notes Paragraph at End of this Aspects Section

1A. The electronic circuit claimed in claim 1 wherein said memory circuitry holds instructions representing the electronic ellipse-fitting procedure executable by said electronic processor.

7A. The electronic circuit claimed in claim 7 wherein said memory circuitry holds instructions for processing the e-compass sensor data and the residual tilt angle e-compass calibration parameter and at least one hard iron calibration parameter to generate the at least one signal representing the corrected measured heading of the e-compass.

15A. The calibration process claimed in claim 15 further comprising generating a second signal representing a hard iron calibration parameter responsive to the e-compass sensor data and the tilt calibration parameter.

17A. The measuring process claimed in claim 17 wherein said utilizing includes utilizing a hard iron calibration parameter to generate that at least one signal representing a measured heading of the e-compass.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Numerical values in the description are illustrative. "Ellipse" and "ellipse-fitting" include various geometries and methods such as the 2D ellipse and 3D ellipsoids and ellipsoid-fitting and other round or oval-shaped closed curves and surfaces. "Representations" herein includes electrical voltages or currents, electrically-, magnetically- or optically-detectable physical alterations, and otherwise detectable physical or electrical alterations or programming. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". The appended claims and their equivalents cover any such embodiments, modifications, and embodiments as fall within the scope of the invention.

What is claimed is:

1. An electronic circuit comprising:
   an e-compass oriented with a heading and having e-compass sensors mounted on different axes, the e-compass having sensor circuitry with outputs that supply e-compass sensor data;
   a tilt sensor including sensor circuitry having outputs to supply tilt sensor data;
   memory circuitry having inputs and outputs and holding a tilt angle e-compass calibration parameter, the tilt angle e-compass calibration parameter representing a residual tilt angle e-compass calibration parameter arising from non-idealities in the tilt sensor and remaining after a coarse detilting procedure performed in response to tilt sensor data and on calibration data from the e-compass sensors; and electronic processor circuitry having leads coupled to the e-compass sensor outputs and to the memory circuitry outputs, the electronic processor circuitry responsive to the e-compass sensor data and the tilt angle e-compass calibration parameter to generate at least one output signal representing a measured heading of the e-compass corrected using the tilt angle e-compass calibration parameter.

2. The electronic circuit claimed in claim 1 in which the tilt sensor includes an accelerometer.

3. The electronic circuit claimed in claim 2 in which the processor circuitry is operable to generate at least one signal representing position in response to the accelerometer and the e-compass sensor data.

4. The electronic circuit claimed in claim 1 in which the memory circuitry holds instructions for processing the e-compass sensor data and the residual tilt angle e-compass calibration parameter to generate the at least one signal representing the corrected measured heading of the e-compass.

5. The electronic circuit claimed in claim 1 further including decoding circuitry for decoding satellite positioning signals, the processor circuitry coupled to the decoding circuitry and operable to generate at least one signal representing position in response to the decoding circuitry and the e-compass sensor data.

* * * * *